(12) United States Patent
Maloney et al.

(10) Patent No.: US 9,971,339 B2
(45) Date of Patent: May 15, 2018

(54) CONTACT PATCH SIMULATION

(71) Applicants: Max A. Maloney, Menlo Park, CA (US); Howard E. Bujtor, San Carlos, CA (US); Brian K. Miehm, Santa Clara, CA (US)

(72) Inventors: Max A. Maloney, Menlo Park, CA (US); Howard E. Bujtor, San Carlos, CA (US); Brian K. Miehm, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 902 days.

(21) Appl. No.: 13/628,007

(22) Filed: Sep. 26, 2012

(65) Prior Publication Data
US 2014/0088746 A1    Mar. 27, 2014

(51) Int. Cl.
*G05B 19/18* (2006.01)
*G05B 19/4099* (2006.01)
*B25J 9/16* (2006.01)

(52) U.S. Cl.
CPC ........ *G05B 19/4099* (2013.01); *B25J 9/1684* (2013.01); *G05B 2219/35009* (2013.01); *G05B 2219/35167* (2013.01); *G05B 2219/35168* (2013.01); *G05B 2219/45062* (2013.01); *G05B 2219/50207* (2013.01); *Y02P 90/265* (2015.11)

(58) Field of Classification Search
USPC ............................ 700/25–27, 121, 159, 164
See application file for complete search history.

(56) References Cited

U.S. PATENT DOCUMENTS

| | | |
|---|---|---|
| 4,907,164 A | 3/1990 | Guyder |
| 5,031,483 A | 7/1991 | Weaver |
| 5,091,861 A | 2/1992 | Geller et al. |
| 5,185,957 A | 2/1993 | Mizuguchi et al. |
| 5,193,314 A | 3/1993 | Wormley et al. |
| 5,441,437 A | 8/1995 | Hulstedt |
| 5,562,525 A | 10/1996 | Mori et al. |

(Continued)

FOREIGN PATENT DOCUMENTS

| | | |
|---|---|---|
| GB | 2248571 | 4/1992 |
| JP | H852640 | 2/1996 |

(Continued)

OTHER PUBLICATIONS

Valente et al., "A new approach for tool path control in robotic deburring operations", ABCM Symposium Series in Mechatronics, 2004.*

(Continued)

*Primary Examiner* — Carlos Ortiz Rodriguez
(74) *Attorney, Agent, or Firm* — Dickinson Wright RLLP

(57) ABSTRACT

A method and an apparatus for smart automation of robotic surface finishing of a three-dimensional surface of a workpiece is described. A finite element analysis simulation is conducted providing data for generation of a three-dimensional path along the surface of the workpiece. The finite element can include properties of the workpiece, finishing tool, and the robot configured to maneuver the finishing tool. The surface of the workpiece is finished using one or more surface finishing tools along the three-dimensional path. The surface of the workpiece includes at least a flat region and a curved region.

20 Claims, 21 Drawing Sheets

(56) References Cited

U.S. PATENT DOCUMENTS

| | | | |
|---|---|---|---|
| 5,779,833 | A | 7/1998 | Cawley et al. |
| 5,938,501 | A | 8/1999 | Gerding et al. |
| 6,585,561 | B2 | 7/2003 | Tokutake et al. |
| 6,796,877 | B1 | 9/2004 | Bingham et al. |
| 6,905,398 | B2 | 6/2005 | Jeong |
| 7,121,938 | B2 | 10/2006 | Suzuki |
| 7,140,088 | B2 | 11/2006 | Suzuki |
| 8,123,593 | B2 | 2/2012 | Hoon |
| 8,401,692 | B2 | 3/2013 | Knaupp et al. |
| 8,423,172 | B2 | 4/2013 | Erichsen et al. |
| 8,747,188 | B2 | 6/2014 | Maloney et al. |
| 8,914,153 | B2 | 12/2014 | Vila Papell |
| 2002/0072297 | A1 | 6/2002 | Kennerknecht et al. |
| 2006/0181236 | A1 | 8/2006 | Brogardh |
| 2011/0081839 | A1 | 4/2011 | Lancaster et al. |
| 2011/0130003 | A1 | 6/2011 | Eisenstock et al. |
| 2011/0172982 | A1* | 7/2011 | Veeraraghavan et al. ...... 703/13 |
| 2011/0190941 | A1 | 8/2011 | Marsh et al. |
| 2012/0220194 | A1 | 8/2012 | Maloney et al. |
| 2014/0235141 | A1 | 8/2014 | Maloney et al. |

FOREIGN PATENT DOCUMENTS

| | | |
|---|---|---|
| JP | 3088944 | 9/2000 |
| JP | 3343171 | 11/2002 |

OTHER PUBLICATIONS

Bernd et al., "A Robot System for High Quality Belt Grinding and Polishing Processes", Cutting Edge Robotics, ISBN 3-86611-038-3, Germany, Jul. 2005.*

Marquez et al., "Process modeling for robotics polishing", Elsevier 2004.*

Application for U.S. Appl. No. 13/294,684, filed Nov. 11, 2011.

Chinese Application for Invention No. 201210043865.7—First Office Action dated Dec. 23, 2013.

Chinese Application for Invention No. 201210043865.7—English version of claims as filed, pp. 1-8.

Chinese Application for Invention No. 201210043865.7—Second Office Action dated Aug. 22, 2014.

* cited by examiner

CONTACT PATCH SIMULATION

BACKGROUND

Technical Field

The present invention relates generally to robotic surface finishing of a three dimensional object. More particularly, applying finite element analysis for reducing design development times of smart automation routines associated with robotic surface finishing.

Related Art

The proliferation of high volume manufactured, electronic devices has encouraged innovation in both functional and aesthetic design practices for enclosures that encase such devices. Manufactured devices can include components that provide an ergonomic shape and aesthetically pleasing visual appearance desirable to the user of the device. A representative component can include a casing for the manufactured device; however, the embodiments described herein can apply equally to other three-dimensional objects having a complex surface and requiring an exacting and uniform surface finish. Other representative components can include an automotive body panel, a turbine blade, a medical implant, etc. The components can be formed from a variety of materials including metals, metal alloys, ceramics, plastics and other materials suitable for containing electronic components. Exterior surfaces of components of electronic devices can be shaped by one or more of a combination of multi-axis robots and computer numerically controlled machinery and can include both two-dimensional flat regions and three-dimensional curved regions. The finishing of the exterior component can require precise and repeatable results to minimize surface variation across the exterior surface of the component. Imperfections in the surface finish can result in a component having an unacceptable appearance or, in some cases, compromised mechanical integrity.

In addition to achieving a high quality, repeatable resulting finish, high volume manufacturing can require minimal time for finishing of the component. Multiple separate tools to finish different regions of the component can require additional manufacturing time than when using fewer finishing tools that can produce a desired finish for both flat regions and three-dimensional curved regions. Determining a three-dimensional motion path and an appropriate contact force for a finishing tool to apply to a surface of a component along the three-dimensional motion path can require significant computer simulation to achieve a consistent mechanical and uniform finished surface for the component. The finishing tool can contact a variable surface area across different regions of the three-dimensional component and can result in a variable finish rather than uniform finish if the contact of the finishing tool is not adjusted continuously throughout the finishing process. Both "off-line" three-dimensional motion path calculations and "real-time" dynamic path adjustment can be combined to improve a surface finish having a desired surface finish appearance and also to provide consistent mechanical properties and geometric form of the component for high volume manufacturing. Thus there exists a need for a method, apparatus and system for smart automation for robotic surface finishing of a three-dimensional surface of a component resulting in a consistent mechanical and visual surface finish.

SUMMARY

This paper describes various embodiments that relate to a method, apparatus, and computer readable medium for determination of a nominal machining path by finite element analysis.

A first method for applying an amount of finishing force to selected points along a finishing path for a workpiece is disclosed. The method includes at least the following steps: (1) creating a model of the workpiece having a predefined geometry and surface finish; (2) receiving a number of characteristics of a finishing tool, and the workpiece at a finite element analysis module configured to execute a finite element analysis routine; (3) receiving at a first robotic handler mechanically coupled to the finishing tool a first set of simulation results from the finite element analysis module in accordance with the received characteristics; and (4) applying a determined amount of finishing force to the workpiece at the pre-selected points along a first finishing path in accordance with the first set of simulation results.

In another embodiment a surface finishing assembly configured to validate simulated finishing path results provided by a finite element analysis module is disclosed. The surface finishing assembly includes at least the following: (1) a finishing tool; (2) a robot having a range of motion suited for maneuvering the finishing tool across a surface of a workpiece; and (3) a finite element analysis module configured to generate a first finishing path for the finishing tool along a surface of the workpiece based on a number of characteristics of the finishing tool, the robot, and the workpiece. The first finishing path is designed to achieve a pre-defined surface finish and geometry of the workpiece during a finishing operation.

In yet another embodiment a non-transitory computer readable medium for applying an amount of finishing force to selected points along a finishing path for a workpiece is disclosed. The non-transitory computer readable medium includes at least the following: (1) computer code for receiving a number of characteristics of a robotic surface finishing assembly and a workpiece at a finite element analysis module configured to simulate a surface finishing operation; (2) computer code for generating a first finishing path for a first finishing tool from a first set of simulation results, the first finishing path including a finishing path along a surface of the workpiece, a velocity profile along the finishing path; and a force profile along the finishing path; and (3) computer code for applying a determined amount of finishing force to the workpiece at the pre-selected points along the first finishing path in accordance with the first set of simulation results.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
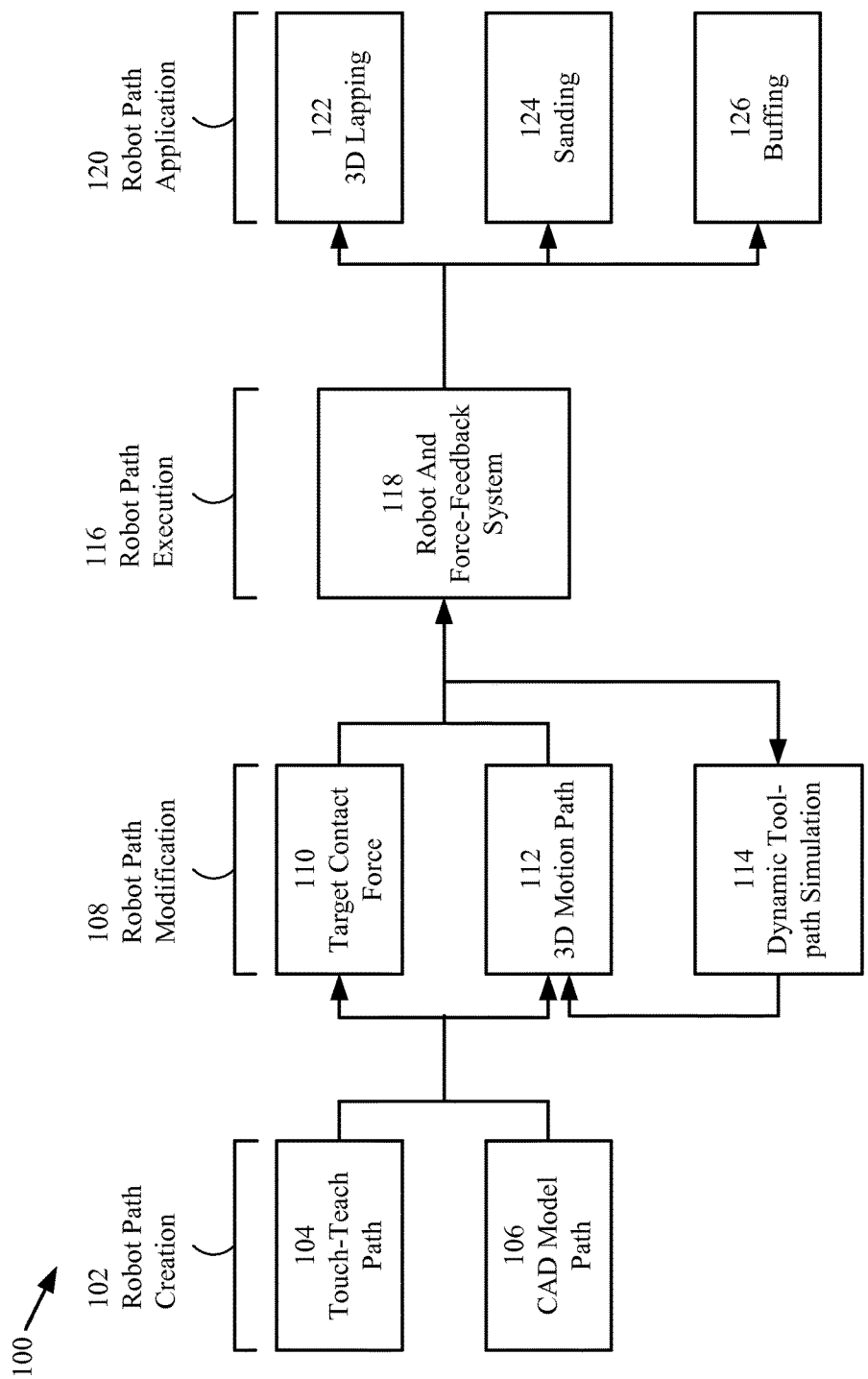
FIG. 1 illustrates multiple stages in smart automation for robotic surface finishing.

The present invention relates generally to robotic surface finishing of a three-dimensional object. More particularly, a method, system, and computer readable medium are described for developing a nominal path by finite element analysis simulation for use with robotic surface finishing of an exterior surface of a three-dimensional object to produce a desired surface finish on a three-dimensional complex shape.

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

High volume manufactured electronic devices can include computer numerically controlled (CNC) machined parts with various geometrically shaped surfaces. The machined parts can be finished using one or more robotic tools, including using surface finishing processes such as lapping, sanding and polishing one or more surfaces of the part. Representative electronic devices can include portable media players, portable communication devices, and portable computing devices, such as an iPod®, iPhone®, iPad®, and MacBook Air® as well as desktop products including an iMac® and a Mac Pro®, and other electronic devices manufactured by Apple Inc. of Cupertino, Calif. Both the tactile and visual appearance of an electronic device can enhance the desirability of the electronic device to the consumer. A variety of materials can be used for the electronic device including metals, metal alloys, ceramics, plastics and other appropriate materials. The embodiments discussed herein can apply equally to different materials used. Metals and metal alloys can provide a lightweight material that exhibits desirable properties, such as strength and heat conduction well suited for components of electronic devices. A representative metal can include aluminum and a representative metal alloy can include an aluminum alloy. A cosmetic outer layer machined from a metal or metal alloy can be cut to a desired shape and finished to a desired reflective and/or matte surface finish appearance. In some embodiments, a continuously smooth shape having a uniformly smooth visual appearance can be desired.

High volume manufacturing can require minimal processing time to increase manufacturing throughput. Finishing a machined part by using a method that can require a minimum number of finishing tools can reduce the processing time required. Finishing both flat surfaces and curved surfaces of the machined part using a common set of robotic tools can provide a finished part having a visually smooth finish with no visually discernible breaks between regions having different cross sections. Curved regions can transition smoothly into flat regions including along corner areas without any visual change in surface appearance. In addition to surface appearance, an exacting and uniform surface finish can be required for mechanical integrity and acceptable cosmetics of the complex shaped three-dimensional machined part. To achieve a uniform surface finish when applying a finishing tool to a three-dimensional surface, both the contact force of the finishing tool to the machined part's surface and the contact area covered by the finishing tool can be taken into account. Contact areas for the finishing tool can vary along a three-dimensional motion path, and contact forces applied along that three dimensional motion path can be adjusted both "off line" (pre-calculated) and "on the fly" (real time calculated) to achieve a specified contact force profile. Certain surface finishing processes, such as a conventional lapping process, can be routinely applied to two-dimensional surfaces but can be not well adapted to three-dimensional surfaces. Surface finishing of a part using an approximately constant pressure (contact force per unit area), rather than using a constant contact force, along the three-dimensional motion path can produce a desired consistent mechanical and visual surface finish. To produce an approximately constant pressure, a variable contact pressure profile along the three-dimensional motion path for the robotic surface finishing tool can be used to produce a finished surface part having a desired appearance, shape and mechanical property.

The methods described herein can be applied to a multitude of surface finishing processes including lapping, sanding and polishing (buffing). Lapping can be considered a process to produce a smooth surface finish on a work piece having a particular shape, usually flat but three-dimensional shapes are also described herein. Sanding can be considered a process to remove material from the work piece to produce a surface having a desired textured finish, whether matte or reflective. Different grades of sanding material can be used to produce different textured finishes. Polishing can be considered the removal of material to produce a specular reflective surface free from scratches. Polishing can use finer grade abrasive materials than sanding. Each of the surface finishing processes can produce a wide range of surface finishes from rough to fine to extremely smooth and reflective surfaces depending on the materials used. The embodiments described herein can apply to a variety of surface finishing processes, and the specific processes outlined are presented as representative embodiments only without any intended limitation.

FIG. 1 illustrates a set of stages 100 that can be used for smart automation of robotic surface finishing of work pieces that can be made from any of a number of different materials. The work pieces can include metal or metal alloy work pieces. In the discussion herein, the term "work piece", component, part and object can refer equally to any partially machined three-dimensional object that can be finished to achieve a consistent mechanical and visual surface finish using one or more surface finishing processes. The surface finishing process steps can include at least one or more of several different surface finishing processes including but not limited to lapping, sanding and polishing. Mechanical grinding or shaping of a metal or metal alloy billet into an unfinished machined part can precede the surface finishing process steps that can produce a metal or metal alloy work piece having a desired surface finish appearance, shape and mechanical property. A robotic surface finishing tool, such as a computer numerically controlled (CNC) machine or a multi-axis robotic arm, can apply an abrasive along the surface of the unfinished machined part to remove material in a controlled manner and to produce a desired shape and appearance with prescribed mechanical properties for a finished version of the machined part. The robotic surface finishing tool can follow a motion control path in one or more dimensions (typically three dimensions) oriented at various angles along the motion control path when finishing the surface of the machined part.

The first stage of smart automation can include robot path creation 102 that can determine an initial three-dimensional motion path for the robotic surface finishing tool to follow along the surface of the machined part. The second stage of smart automation can include robot path modification 108 that can refine the three-dimensional motion path taken by the robotic surface finishing tool relative to the surface of the part to produce a desired finished result. The robot path modification 108 can be based on profiles for variables along the three-dimensional motion path that can be generated "off-line" through simulation and/or experimentation. The third stage of smart automation can include robot path execution 116 that can control one or more of a position, an angle, a speed, a velocity and other factors that can affect material removal by the robotic surface finishing tool when contacting the surface of the part. Force-feedback control can be used to measure a force of the robotic surface finishing tool to the surface of the part and to modify one or more of the robot factors in "real-time". The final stage of smart automation can include robot path application 120 of the three-dimensional motion path to one or more surface finishing processes. A sequence of processes can be used to produce a part having a desired surface finish appearance, shape and mechanical property.

For the first stage of smart automation of robotic surface finishing, the robot path creation stage 102 can produce a three-dimensional motion path for a robotic surface finishing tool by one or more different methods. The three-dimensional motion path can include six different variables capturing six degrees of freedom that can represent translational position (x, y, z) and angular orientation (rX, rY, rZ), i.e. rotation about each of the (x, y, z) axes, at discrete points in time. (The angular orientation can also be referred to as yaw, pitch and roll.) The robot path creation stage 102 can include a "CAD Model" path generation step 106 that uses a computer aided design (CAD) model for a part to be finished to generate a path as described next. The robot path creation 102 can also include a "Touch Teach" path generation step 104 that uses an actual robot and sample part (or portion thereof) to generate the robot path as described later below.

In a CAD model path generation step 106, a three-dimensional motion path can be developed based on a three-dimensional CAD model for the part to be finished. The CAD model can include a representative shape that the part can take before and/or after finishing. The CAD model can be imported into one or more software tools used to determine a three-dimensional motion path for an associated robot. A representative robot can include a multiple-axis robotic arm that can manipulate a surface finishing tool. Using software tools, a user can select a sequence of points on the three-dimensional CAD model. Alternatively, the user can overlay a prescribed path or a set of prescribed path segments on the three-dimensional CAD model. At each point on the three-dimensional CAD model, a section of the surface finishing tool can contact the surface of the part. The points can be spaced more closely along regions of the surface of the part that have variable shape, such as along a curved edge and in corner regions of the part. The points can be spaced further apart along regions of the surface of the part that have a more uniform shape, such as along a flat bottom region and/or flat top region.

The software tools can generate one or more continuous three-dimensional motion paths by (1) connecting subsets of the sequence of points, (2) connecting subsets of the path segments and (3) directly using the prescribed path placed on the three-dimensional CAD model or any combination thereof. A robotic arm can hold a surface finishing tool and can follow the generated (or prescribed) three-dimensional motion paths to abrade and thereby finish the surface of an actual part having the shape of the three-dimensional CAD model. Generating the three-dimensional motion paths through the CAD model path generation step 106, can be time consuming and can require significant amounts of experimentation to realize a desired finished surface result. Using knowledge of finishing motions that a human can use to abrade, shape, sand, polish and/or buff a part, an alternative starting path for the robotic surface finishing can be developed using a "touch teach" model path generation step 104 as described next.

Programming a three-dimensional motion path for a robotic surface finishing tool that uses a multiple-axis robotic arm can be accomplished by "teaching" the robot a sequence of positions and orientations for the robotic arm to take. Inputting the sequence of positions and orientations can be realized in one embodiment by manipulating an end of the multiple-axis robotic arm and recording the positions and orientations of the end of the multiple-axis robotic arm for the resulting three-dimensional motion path over a span of time. This manipulation can be referred to as "lead by the nose", as the "nose" end of the robotic arm can be pushed, pulled, twisted and turned as required to realize a desired finishing motion. The recorded sequence of positions and orientations can be adjusted subsequently in software to "smooth" transitions, to refine orientations and to "fine tune" velocities and positions. In one embodiment, the user can manipulate the robotic arm over a region of a partially or completely finished part surface to generate a path section. The region can be representative of the entire part to be finished, such as a quarter-section that includes one corner of an approximately symmetrical rectangular part. A complete path that covers the entire part to be finished can be created by replicating with appropriate orientation a refined version of the path section generated for the region of the part.

The three-dimensional motion path created by either the CAD model path creation step 106 or captured by the touch teach path creation step 104 can include a series of positions and orientations at a sequence of time instants. Refinement of positions along the captured path can include smoothing the trajectories of the path and spacing the trajectories as precisely as desired, such as closer together, further apart, with more uniformity or having one or more other desired properties for the trajectory of the three-dimensional motion path. Refinement of orientations can include adjusting angular position so that a particular point on the robotic finishing tool is oriented normal to the surface of the part being finished (or at a particular deviation from normal to the surface). In an embodiment, it can be preferred to orient the robotic finishing tool to be approximately uniformly normal to the surface of the part along the three-dimensional motion path. Adjustment of the path can also include smoothing irregularities that can occur when generating the initial path by the "touch teach" path creation step 104. Human motion can capture macro-positions well but can specify micro-positions with less accuracy that a robot can achieve.

A captured initial three-dimensional path can be compared against three-dimensional CAD data for an unfinished part and/or for a finished part to refine and idealize the path. A refinement of the path, for example, can maintain a uniform distance along a portion of the path that results in a constant contact surface area between the finishing tool and the part being finished. Other variables can also be considered when modifying the three-dimensional motion path that can produce a desired result. In representative embodiments, a three dimensional motion path can be modified to achieve one or more of the following features: a uniform distance, a uniform force, a uniform pressure, a smoothness of the path, a smoothness of force by the finishing media to the surface of the part, a smoothness of pressure, bounds on the slope (i.e. changes) for a variable, etc. The smoothly adjusted three-dimensional motion path can provide a good initial starting point for additional refinement in the robot path modification stage 108.

The adjusted initial three-dimensional motion path created in the robot path creation stage 102 can be further modified to account for variations that can occur during the surface finishing process. For a flat surface, the relatively flat abrading surface of a surface finishing tool can contact a relatively uniform area as the robotic arm moves across the surface of the work piece. For a curved surface, however, the relatively flat abrading surface can contact a continuously varying surface area as the robotic arm traverses a path on the surface of the work piece. Over an edge region, the abrading surface can contact less surface area of the work piece being finished than over a flat region, and over a corner region, the abrading surface can contact even less surface area. A robotic finishing tool can be configured to contact the surface of the work piece with a constant contact force, i.e. a global setting of a target contact force, over the entire three-dimensional motion path. A constant contact force, however, can result in a variable contact pressure, as contact pressure can be calculated as the contact force divided by surface area contacted.

A variable contact pressure of the finishing tool when abrading the surface of the work piece with a constant contact force can result in an undesired variable surface finish rather than a desired uniform surface finish. Edge regions can be abraded more than the flat regions, and corner regions can be abraded even more, as the contact area can be substantially less than the flat regions. In a flat region, an approximately uniform surface area can be contacted (depending upon the normal distance between the robotic finishing tool and the surface of the work piece), while in an edge region a linear (i.e. substantially narrow surface area) can be contacted. In a corner region an approximately "point" surface area can be contacted compared with the larger uniform surface area along the flat region of the work piece. A constant contact force can result in substantially different contact pressure values along a flat region, an edge region and a corner region. The robot path modification stage 108 can be used to refine the three-dimensional motion path to achieve a more uniform and desired surface finish appearance and a desired shape with preferred mechanical properties than by using the initial path determined in the robot path creation stage 102. In an embodiment, the robot path modification stage 108 can measure force applied to the surface of the part and feedback the force measurement to refine the position and orientation of the tool.

The actual force of contact between the robotic surface finishing tool and the surface of the work piece can be a function of the robotic arm position and the compressibility of any finishing media (such as a pad with a porous layer in which a slurry sits, the slurry containing suspended abrasive particles, or a compressible foam backing pad in contact with a piece of sandpaper) between the robotic arm and the work piece. A contact force sensor can be placed in the robotic arm that can measure the actual contact force along the three-dimensional motion control path. The position of the robotic arm can be adjusted automatically by the robotic control system to maintain a constant contact force between the robotic surface finishing tool and the surface of the work piece; however, as described above, a constant contact force along the three-dimensional motion path can result in an undesired variation in surface finish. A target contact force profile 110 that varies along the three-dimensional motion path can provide a more constant pressure (force per unit area) and result in a more uniform surface finish.

The contact force applied by the robotic surface finishing tool can vary with the contact area and can change to ramp smoothly up and down along the motion path to minimize or eliminate abrupt changes in contact force that can result in marring of the surface finish. The robotic finishing tool can be programmed to approximate a constant pressure profile along the three-dimensional motion path by targeting a variable contact force profile rather than a constant contact force profile. Specifying a target contact force for each point along the path can accommodate the natural variation in contact surface area that the finishing tool can encounter as it moves along different regions of the surface of the work piece being finished. An estimate of the actual contact force can be calculated off line to determine an adjusted position and orientation for the robotic finishing tool along the three-dimensional motion path.

A multi-axis load cell can be included in the robotic arm that can measure forces and torques along and about one or more independent orthogonal axes. In one embodiment, the contact force (actual and/or target) can be adjusted by changing the distance between the robotic arm and the work piece along a direction normal to the surface of the work piece along the three-dimensional motion path. The multi-axis load cell can permit "on the fly" adjustment of the three dimensional motion path to realize a variable contact force profile along the path within a given accuracy. A simpler single-axis load cell can provide a contact force measurement along a nominal normal direction to the contacted area only.

A dynamic tool-path simulation step 114 can be used to refine the three-dimensional motion path in one or more repeated simulation cycles. The "rough" nominal three-dimensional motion path obtained in the robot path creation stage 102 can be refined based on a target contact force profile simulation 110 that can produce a variable target contact force profile. A simulation of the contact force, pressure, abrasion and other properties can be repeated in the dynamic tool-path simulation step 114 to further refine the three-dimensional motion path. The simulation can include calculations of one or more of force, pressure, contact area, finishing media abrasion properties, finishing media compressibility and conformability, work piece geometry, robotic arm position, finishing media fluid dynamics, and other properties that can influence the finishing results. Iterative testing of the three dimensional motion path and resulting surface finish on samples of the work piece can be included in the dynamic tool-path simulation 114.

Regions of the surface of the work piece following abrasion can be reviewed at different points to determine the effect of contact surface pressure and abrasion materials. In addition, a compressible pad can be coated with ink and contacted at multiple points along the surface of the work piece to estimate the contact surface area realized for different geometries of the work piece and contact pressure values. The observed contact areas can be included in the dynamic tool-path simulation step 114 to further refine the estimates of contact pressure that can be used to determine the three-dimensional motion path. The simulation can also include any effects of force feedback response time (e.g. lag between a measured contact force and a resulting change in the actual position and/or orientation of the robotic arm).

The refined three-dimensional motion path developed in the robot path modification stage 108 can be used in a robotic controlled surface finishing system in the robot path execution stage 116. The robotic surface finishing tool can include a force feedback control system that can track a desired contact force profile determined in the robot path modification stage 108. The target contact force profile 110 can vary along the three-dimensional motion path taken by the robotic arm as the robotic finishing tool abrades the surface of the work piece. While the robot path modification stage 108 can be used to refine the initial path developed in the robot path creation stage 102, feedback in the robot path execution stage 116 can further minimize variation from a prescribed set of variables along the three-dimensional motion path. The robot path modification stage 108 can be used to ensure that the force-feedback system can accommodate a range of variation about the target force profile determined.

Load cells that measure force and torque can be linear over a limited range of values. In one embodiment, the robot path modification stage 108 can account for a range of linearity for a load cell in the robotic finishing tool in determining the three-dimensional motion path. When a wider range of contact force values can be desired along the three-dimensional motion path, multiple load cells can be included in parallel in the robotic finishing tool with partially overlapping linear ranges. The force feedback system can allow for "real time" "on the fly" adjustment of the position and orientation of the robotic surface finishing tool during the finishing process. This dynamic adjustment can be used to account for work piece variation in dimensions, position within a fixture, material properties, and other natural variation that can occur in a high volume manufacturing environment. With a refined three-dimensional motion path dynamically adjusted during the finishing process, a consistent surface finish appearance, uniform mechanical integrity and a desired shape can be achieved across multiple parts in a rapid and controlled manner.

The robot creation, modification and execution stages 102/108/116 described above can be used in one or more robot path applications 120 including lapping 122, sanding 124 and buffing (polishing) 126. Three-dimensional lapping 122 can be considered an extension of a conventional two-dimensional lapping process. The three-dimensional lapping 122 can account for variation in surface contact area between a lapping tool and the variable shaped surface of the work piece being abraded. A normal two-dimensional lapping process can be ill adapted for finishing a three-dimensional surface on a part. The use of multi-axis robots that include a variable contact force and a force-feedback system can adapt a lapping process more readily to three-dimensional parts. Sanding 124 and buffing 126 can be accomplished using vibrating or rotating surfaces with robotic control of their contact to the surface of the part being finished. The robotic control can be applied to the sanding/buffing tool or to the work piece or to both. Additional details on robotic surface finishing method, apparatus and system are described below.

Figure 2A:
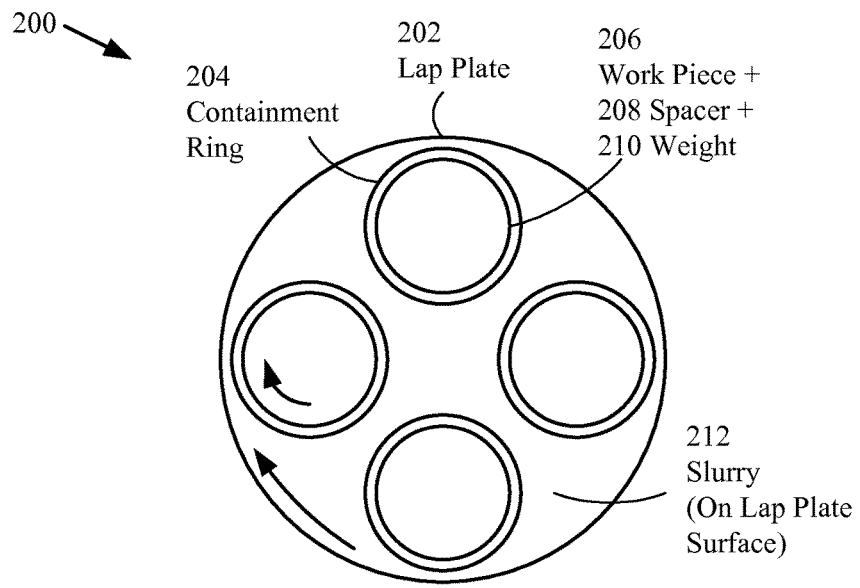
FIGS. 2A-2B illustrate a prior art two-dimensional lapping system.
Figure 2B:
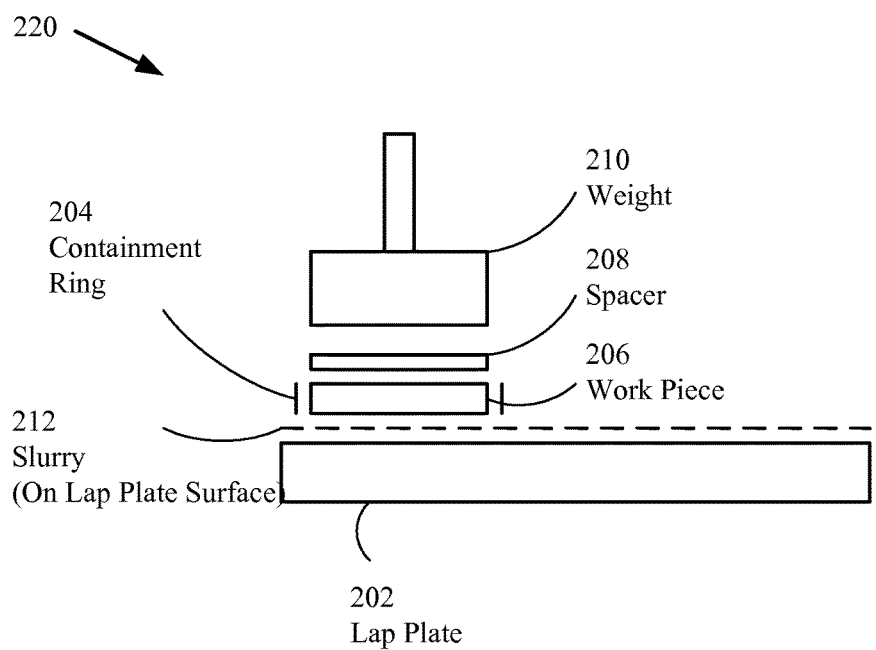

FIGS. 2A and 2B illustrate a top view 200 and a side view 220 of a prior art two-dimensional lapping system. The base of the two-dimensional lapping system can include a lap plate 202. A work piece 206 (or multiple work pieces) can be placed in a containment ring 204 that can maintain the work piece 206 stable during lapping. A spacer 208 can be placed on top of the work piece 206 and a weight 210 can bear down on the spacer 208 and the work piece 206. As shown in FIG. 2A, multiple containment rings 204 can be placed around a single lap plate 202, and multiple work pieces can be placed in each containment ring 204. Thus multiple work pieces 206 can be lapped simultaneously. An abrasive compound can be suspended in a slurry 212 that can be pumped or placed on the surface of the lap plate 202. The lap plate 202 (and in some cases the weight 210 and spacer 208) can be rotated thereby contacting the abrasive compound in the slurry 212 against a surface of the work piece 206. Material from the surface of the work piece can be precisely removed to produce a desired smooth, flat surface. Typically, the surface can be shaped to a tight dimensional tolerance with good uniformity. The lap plate 202 can rotate at moderate speeds with moderately abrasive particles in the slurry 212. The use of an abrasive in a slurry 212 can be called "free abrasive" lapping. Alternatively, abrasive particles can be bonded to a substrate, such as a pad, paper or polyester substrate that can be placed between the work piece and the lap plate in a process known as "fixed abrasive" lapping. Lapping can be applied to a surface after a grinding process has produced a rough shape to a work piece. Lapping can provide typically a fine, smooth and reflective surface finish, although the specific finish can depend on the abrasive materials used. Sanding and polishing (or buffing) can also be applied before or after the lapping process to produce a desired surface finish of the work piece. No specific order for the application of different surface finishing processes is intended by the description herein. The two-dimensional lapping process illustrated in FIGS. 2A and 2B can be applied to flat surfaces but can be inappropriate for a three-dimensional surface of a work piece.

Figure 3:
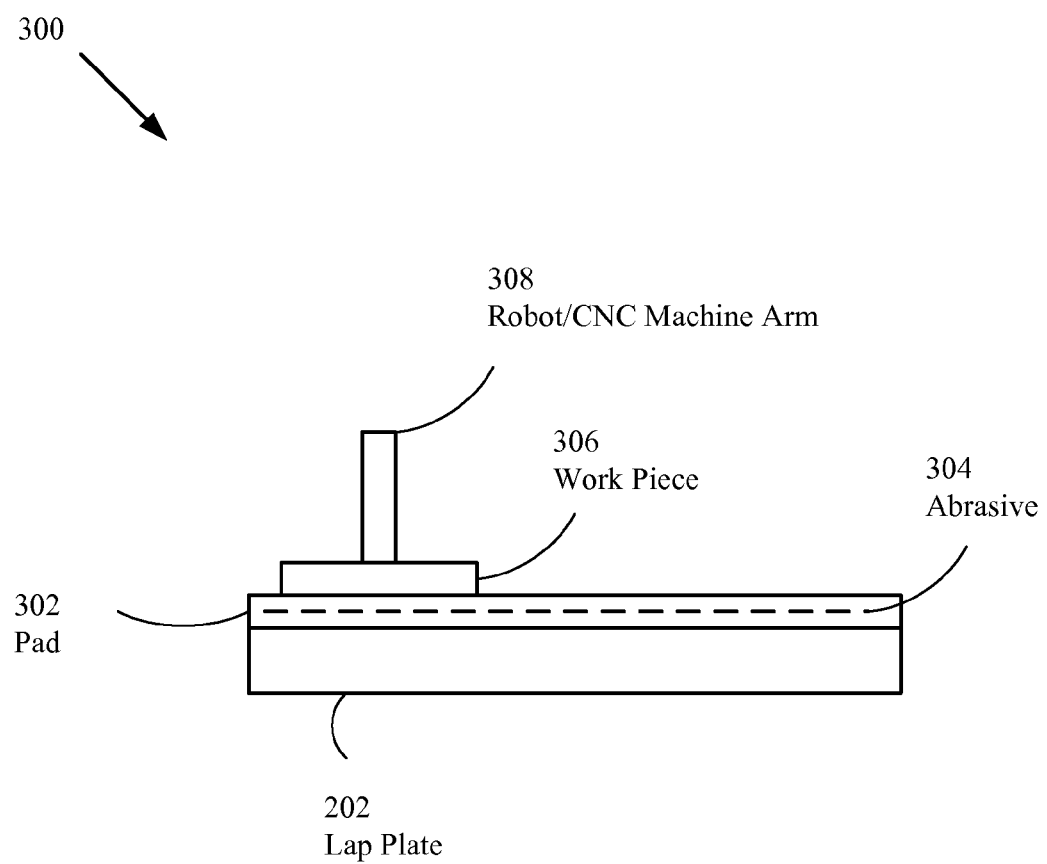
FIG. 3 illustrates an apparatus arranged for robotic two-dimensional lapping of a work piece.

FIG. 3 illustrates an alternative lapping system 300 in which an abrasive 304 can be suspended in a slurry that can be flowed onto a porous top layer of a pad 302 onto which a work piece 306 can be positioned for lapping. A robotic arm (or CNC machine arm) 308 can position the work piece 306 relative to the pad 302 on the lap plate 202. The lap plate 202 can rotate, while the work piece 306 can be pressed downward onto the pad 302 by the robotic arm 308. In one embodiment, the work piece 306 can be mounted to the robotic arm 308 so that the robotic arm 308 can also rotate the work piece 306 relative to the pad 302. The relative motion of the work piece 306 to the pad 302 attached to the lap plate 202 can abrade the surface of the work piece 306.

Figure 4:
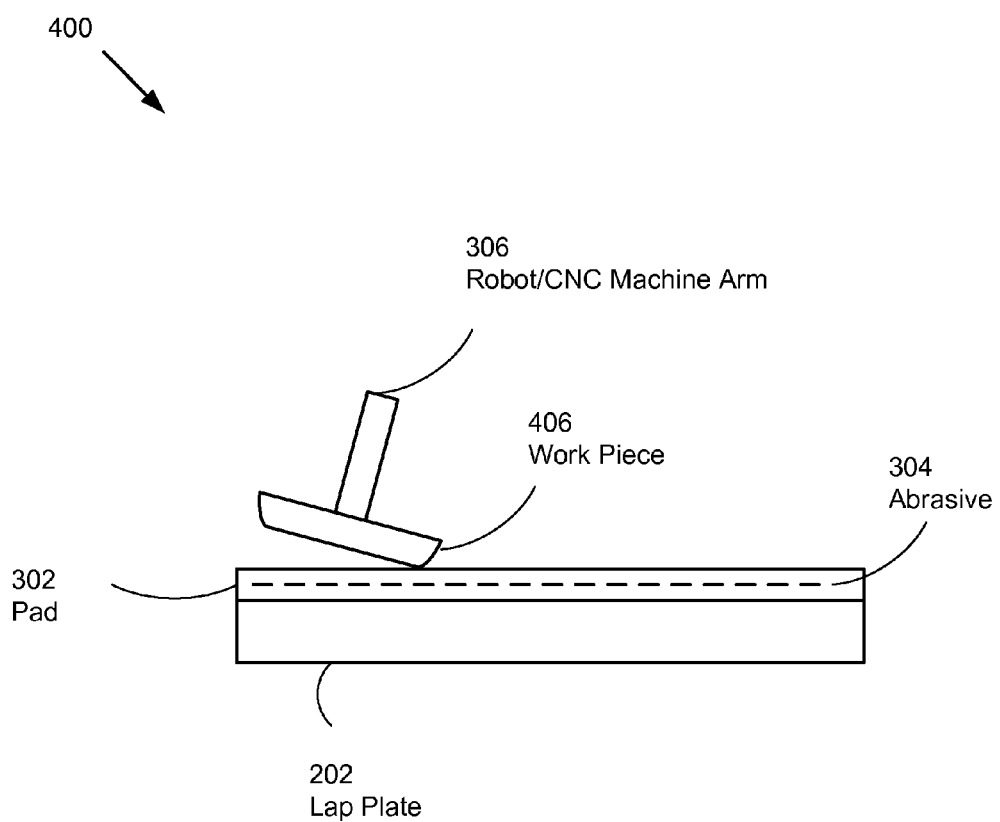
FIG. 4 illustrates the apparatus of FIG. 3 arranged for robotic three-dimensional lapping of a work piece.

With the work piece 306 mounted to the robot/CNC machine arm 308 as shown in FIG. 3, the work piece 306 can also be positioned at an angle to the abrasive pad 302. As shown in FIG. 4, the two-dimensional lapping system 300 of FIG. 3 can be modified to become a three-dimensional lapping system 400, thereby permitting precise and consistent surface finishing on three-dimensional surfaces of work pieces 406. The work piece 406 can include three-dimensional non-flat surfaces that can be "lapped" by the lap plate 202 rotating with the pad 302 containing the abrasive 304. The robot/CNC machine arm 306 can be controlled to vary the position of the work piece 406 relative to the lap plate 202, changing along any combination of three translational (x, y, z) axes and three rotational axes (rX, rY, rZ) axes. The force of the work piece 406 against the pad 302 on the rotating lap plate 202 can be measured and adjusted to ensure a desired surface finish. A surface area of the work piece 406 that contacts the pad 302 can vary depending on the region of the work piece 406 being finished. For example, the surface area of a flat region being lapped as shown in FIG. 3 and differ from the surface area of an edge region being lapped as shown in FIG. 4.

Figure 5:
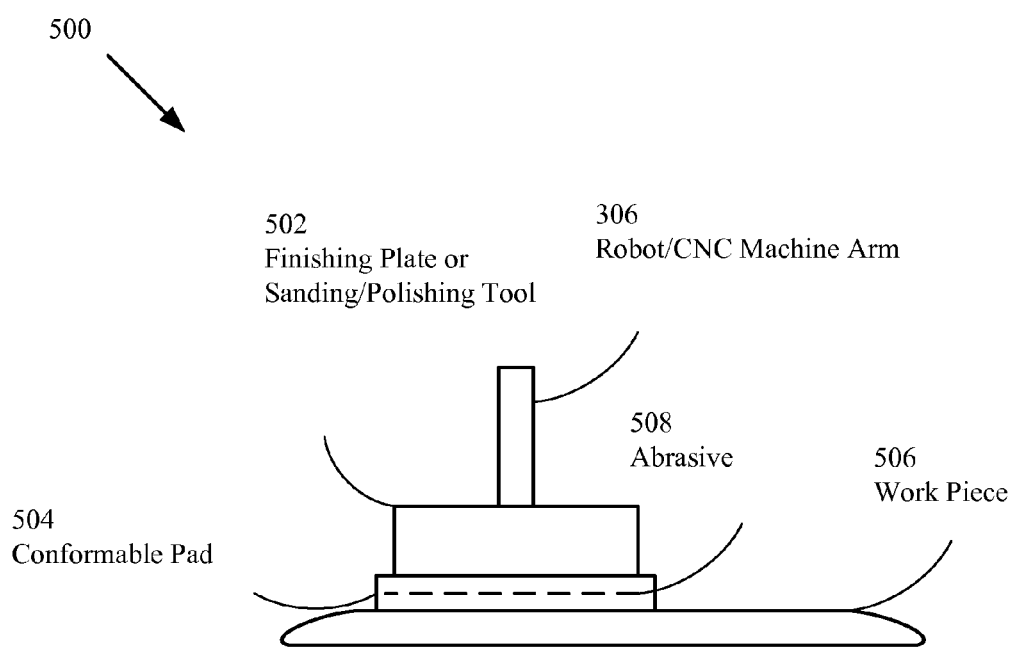
FIG. 5 illustrates an apparatus arranged for robotic two-dimensional surface finishing of a work piece.
Figure 6:
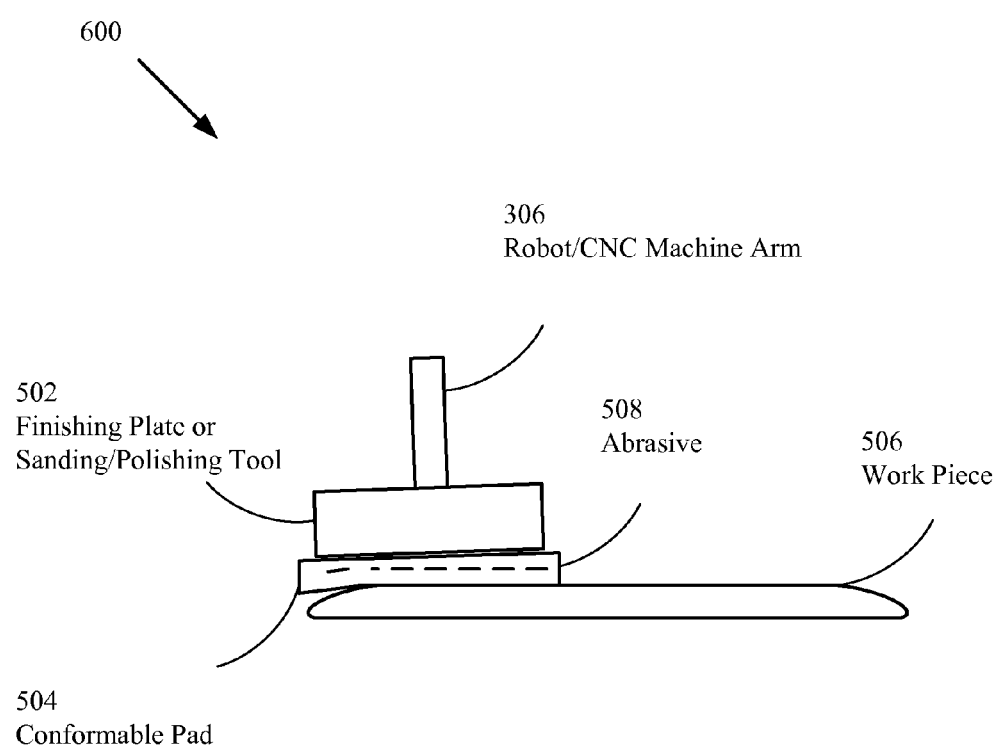
FIG. 6 illustrates the apparatus of FIG. 5 arranged for robotic three-dimensional surface finishing of the work piece.

FIGS. 5 and 6 illustrate an alternative arrangement for a three-dimensional lapping system 500/600 to abrade a three dimensional surface of a work piece. A work piece 506 can include both flat regions and curved regions. The robot/CNC machine arm 306 can be attached to a finishing plate or sanding/polishing tool 502. The robot/CNC machine arm 306 can move the finishing plate or sanding/polishing tool 502 in one or more complex motions relative to the work piece 506, including rotational, translational and vibratory motions. An abrasive 508 can be suspended in a slurry that can be flowed onto a porous top layer of a conformable pad 504 and can abrade the surface of the work piece 506 as the robot/CNC machine arm 306 moves the finishing plate or sanding/polishing tool 502. As shown in FIG. 5, for flat regions of the surface of the work piece 506, the three-dimensional lapping system 500 can "lap" or "sand" the surface of the work piece 506 in a two-dimensional plane.

As shown in FIG. 6, the three dimensional lapping system 600 can further lap or sand three-dimensional edge regions of the work piece 506. The conformable pad 504 can change shape to conform to the surface of the three-dimensional edge region of the work piece 506. The robot/CNC machine arm 306 can change angular position of the finishing plate or sanding/polishing tool 502 to accommodate the three-dimensional "lapping" or "sanding" and can adjust a contact force (and resulting contact pressure) to account for different amounts of surface area contacted between the conformable pad 504 and the work piece 506 in different regions on the surface of the work piece 506. In one embodiment, the robot/CNC machine arm 306 can adjust the angle of contact between the finishing plate or sanding/polishing tool 502 and the work piece 506 to be normal (i.e. perpendicular) to the surface of the work piece 506 at a point on the finishing plate or sanding/polishing tool 502. Sanding can use vibratory motion with the conformable pad 504 (e.g. a compressible foam pad) or with "sand paper" having a range of different sized abrasive grit material and hardness embedded therein. Common abrasives for a metal or metal alloy work piece 506 can include silicon dioxide and aluminum dioxide with a range from 600 to 1000 grit.

To achieve a desired surface finish, the work piece 506 can be shaped using one or more different surface finishing processes, including a grinding process to produce a rough shape, a sanding process to produce a rough surface, a lapping process to produce a uniform surface, and a polishing or buffing process (as described next) to further refine the surface. In one embodiment, a sequence of processes can be used to produce a work piece having a uniform surface finish across all exposed regions of the work piece, without visible joins or transitions between differently shaped regions, such as across a flat bottom, along a curved edge region and around a highly curved corner region. No particular order for surface finishing processes are intended by the description herein, and one or more different surface finishing processes can be used to achieve a particular surface finish having desired properties. A combination of different surface finishing processes that can use different materials can be applied as required to produce the particular surface finish.

Figure 7:
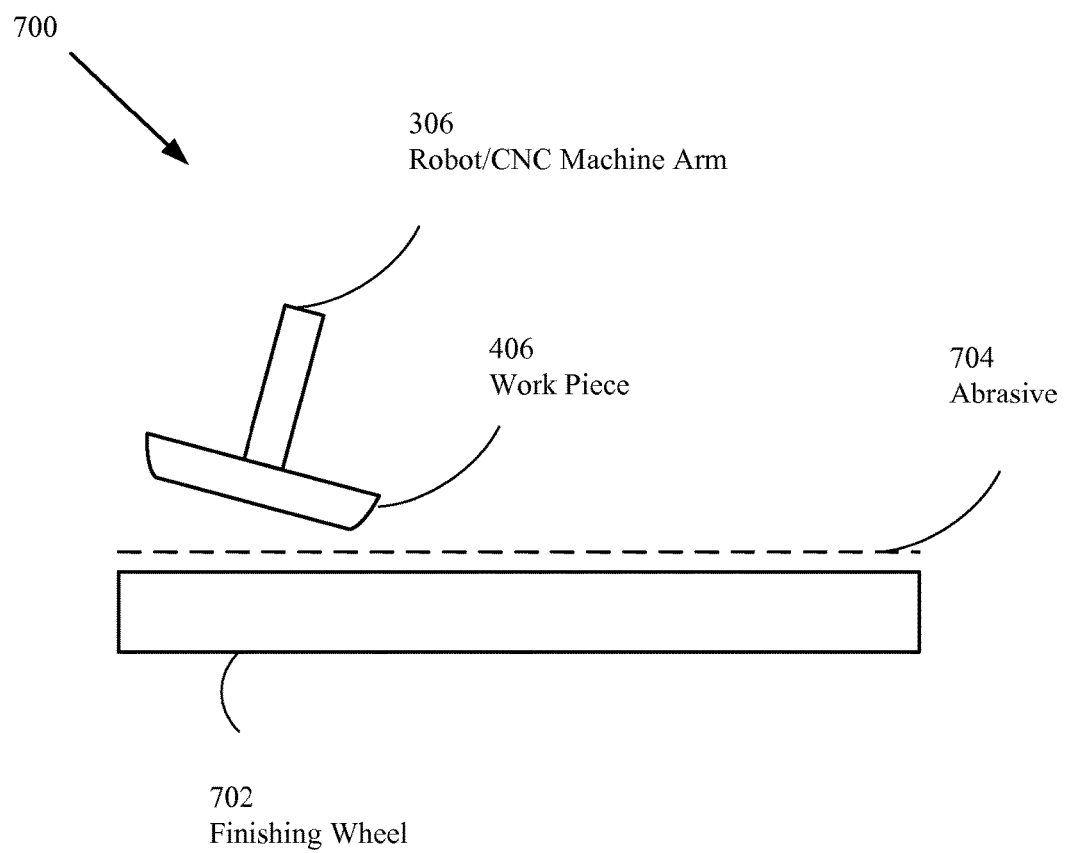
FIG. 7 illustrates another apparatus for robotic three-dimensional surface finishing of a work piece.

FIG. 7 illustrates a three-dimensional surface finishing system 700 that can be used to sand and/or buff/polish three-dimensional surfaces of the work piece 406. The robot/CNC machine arm 306 can position the work piece 406 along any of six degrees of freedom, i.e. along three different translational axes and about three different rotational axes. The work piece 406 can be moved by the robot/CNC machine arm 306 to change the contact area and force of contact between the work piece 406 and an abrasive 704 coated surface of a finishing wheel 702. The finishing wheel 702 can rotate at an appropriate speed, and the abrasive 704 can differ for different finishing wheels 702 to achieve a desired finish on the surface of the work piece 406. The three-dimensional surface finishing system 700 can include a multi-axis load cell (not shown) to measure forces and moments and can determine a force normal to the surface of the work piece 406 surface when contacting the work piece 406 to the abrasive surface of the finishing wheel 702.

A simple (e.g. single axis) load cell can be used to measure a force in a "nominal" normal direction. By applying a variable contact force between the work piece 406 and the finishing wheel 702, a uniform surface finish can be applied to the work piece 406 along both flat regions and shaped regions. The flat regions of the work piece 406 can have a large surface area in contact with the abrasive 704 surface of the finishing wheel 702, while curved edge and corner regions can have a smaller surface area in contact with the finishing wheel 702. A three-dimensional motion path of the work piece 406, under control of the robot/CNC machine arm 306, can realize an approximately constant pressure (i.e. contact force divided by contact surface area) between the work piece 406 and the finishing wheel 702. A simulation path as described earlier can determine a nominal path taken, and real time adjustment using force feedback based on measurements from one or more multi-axis load cells mounted in the surface finishing apparatus 700, can result in a desired uniform surface finish that can be difficult to achieve with conventional two-dimensional lapping systems and/or finishing systems that use a constant global contact force.

Figure 8A:
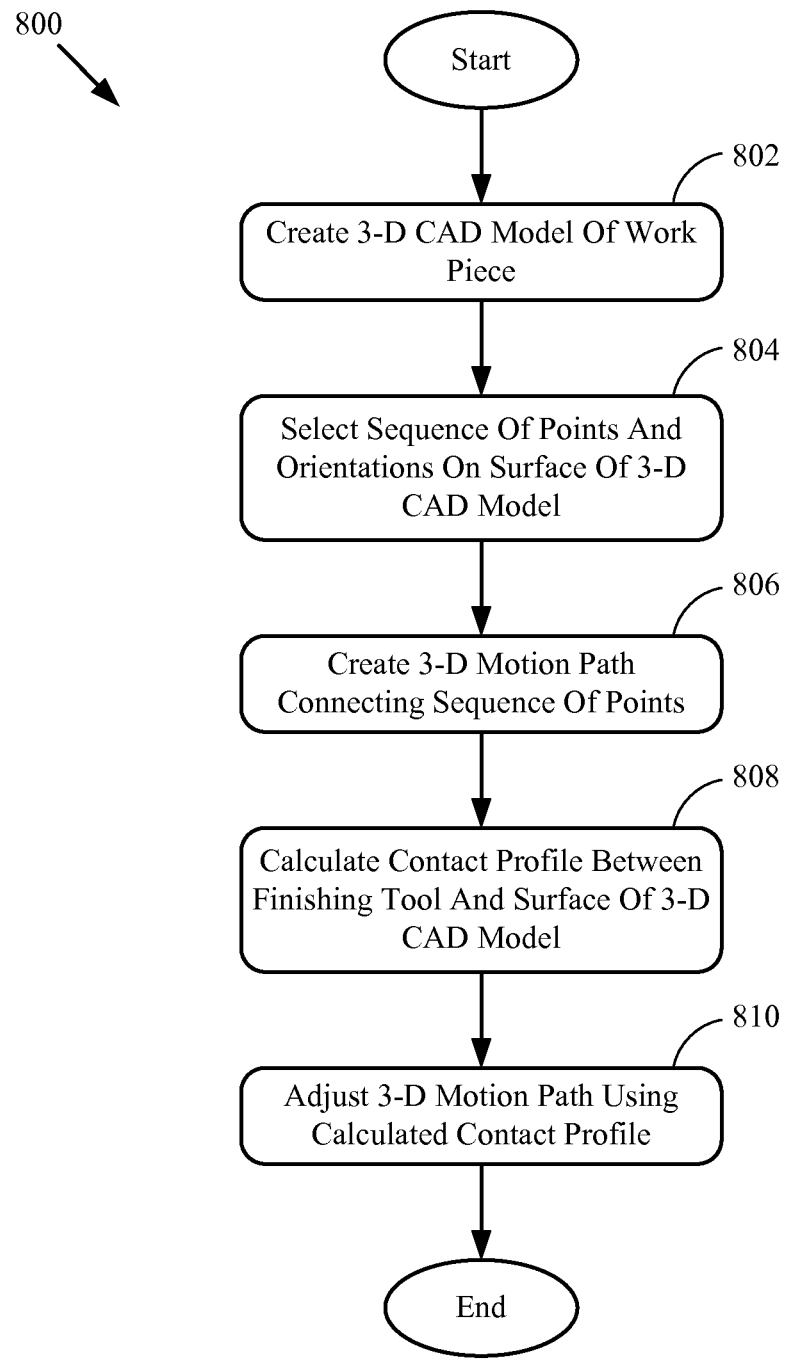
FIGS. 8A and 8B illustrate representative methods for determining a three-dimensional motion path for a robotic surface finishing tool.
Figure 8B:
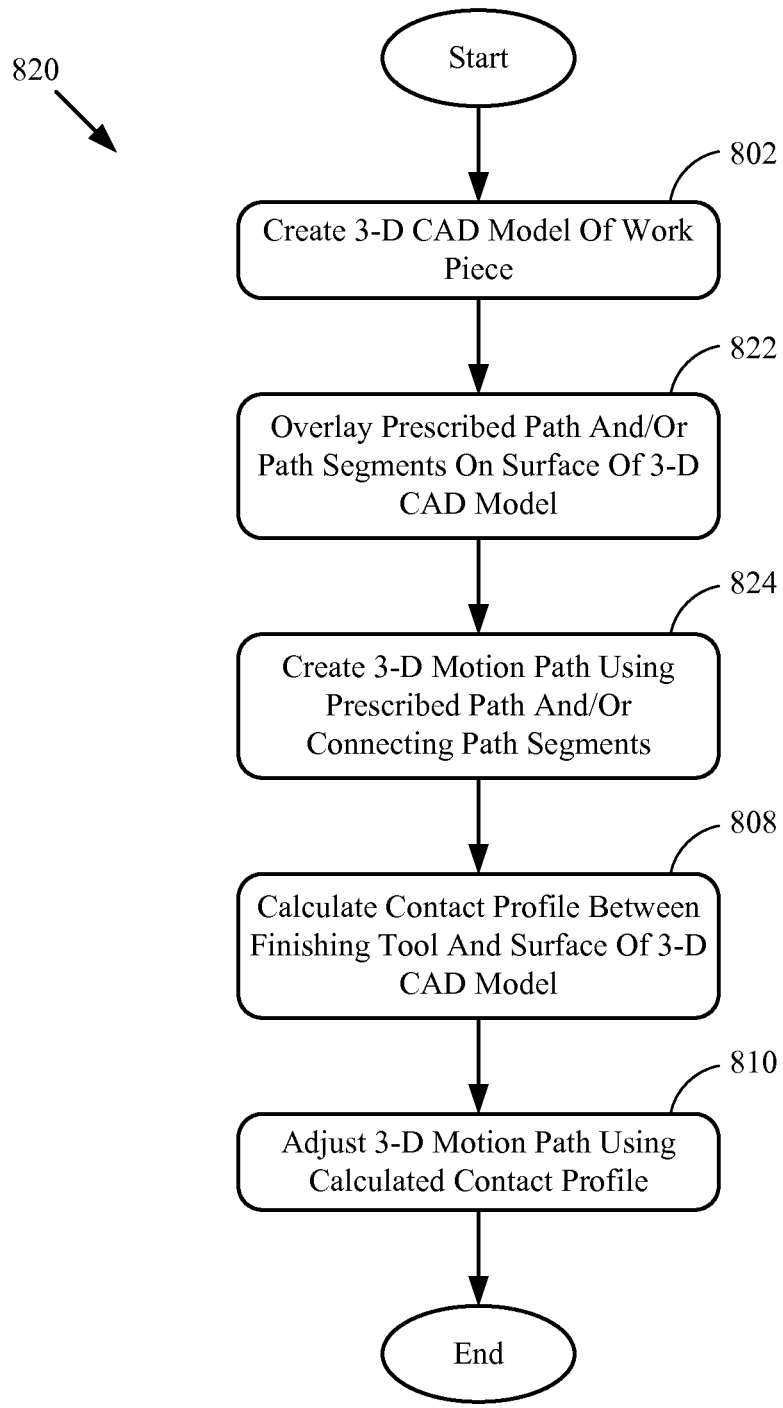

FIG. 8A illustrates a method 800 to create a three-dimensional motion path for a robotic surface finishing apparatus. In step 802, a three dimensional CAD model of a work piece is created. In step 804 a sequence of points and associated orientations for each point are selected along the surface of the three-dimensional CAD model. The points in the sequence are spaced at regular or irregular intervals. The point spacing is determined by an amount of change in one or more variables. Representative variables include position and angular orientation of the surface of the CAD model for a point. In step 806, a three-dimensional motion path is created by connecting the sequence of points and by interpolating changes in position and orientation for a robotic surface finishing tool between each of the points in the sequence. In step 808, a contact profile is calculated along the three-dimensional motion path between the robotic surface finishing tool and the surface of the CAD model. In step 810, the three-dimensional motion path is adjusted based on the calculated contact profile. In an embodiment, the adjustment achieves a desired uniformity for one or more variables. A representative variable includes an angular orientation with respect to the surface of the three-dimensional CAD model along the resulting three-dimensional motion path. Another representative variable includes a pressure applied by the surface finishing tool at each point along the three-dimensional motion path. FIG. 8B illustrates a variant method 820 to create the three-dimensional motion path for the robotic surface finishing apparatus. In step 822, a prescribed path is overlaid on the surface of the three-dimensional CAD model, or one or more path segments are placed on the surface of the three-dimensional CAD model. In step 824, the three-dimensional motion path is created by using the overlaid prescribed path and/or by connecting one or more of the overlaid path segments. The remaining steps in the method illustrated in FIG. 8B are the same as those described for FIG. 8A.

Figure 9:
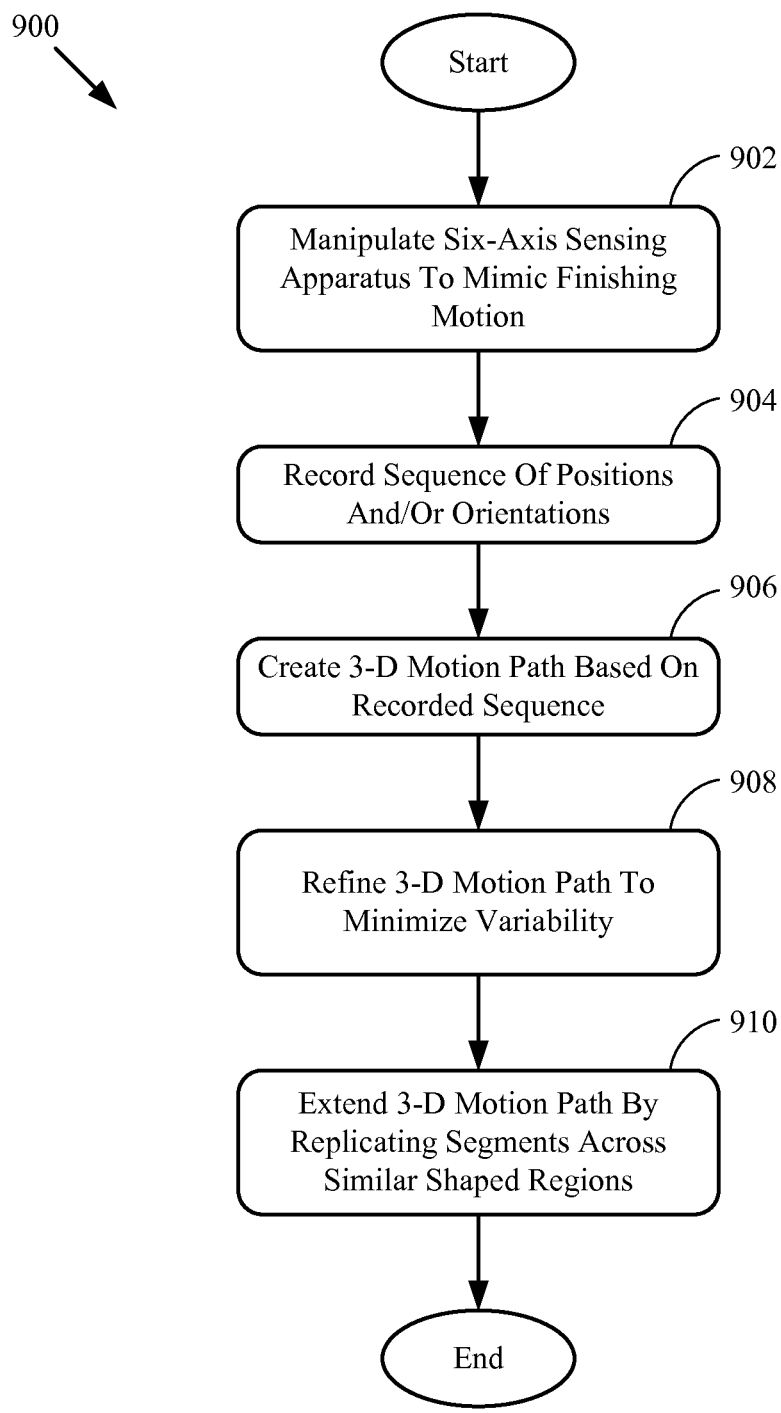
FIG. 9 illustrates another representative method for creating a three-dimensional motion path for a robotic surface finishing tool.

FIG. 9 illustrates a second method 900 to create a three-dimensional motion path for a robotic surface finishing apparatus. In step 902, a user manipulates a six-axis sensing apparatus to mimic a surface finishing motion. A representative surface finishing motion is a three-dimensional motion that a human uses to finish the surface of a work piece. In an embodiment, the user manipulates the sensing apparatus by moving an end of a robotic arm through space above and/or along the surface of a work piece. The sensing apparatus, in step 904, records a sequence of positions and/or orientations that represent the surface finishing motion. In step 906, a three-dimensional motion path is created based on the recorded sequence of positions and/or orientations. In step 908, the three-dimensional motion path is refined to correct for variability in position and/or orientation of the sensing apparatus with respect to the surface of the work piece. Uniformity of translational position and/or angular position between the work piece and a surface finishing apparatus are accounted for during the refinement. In step 910, the 3-D motion path is extended to regions of the work piece having similar shape, such as on four different corners of a work piece, by replicating segments from the initial (and refined) three-dimensional motion path.

Figure 10:
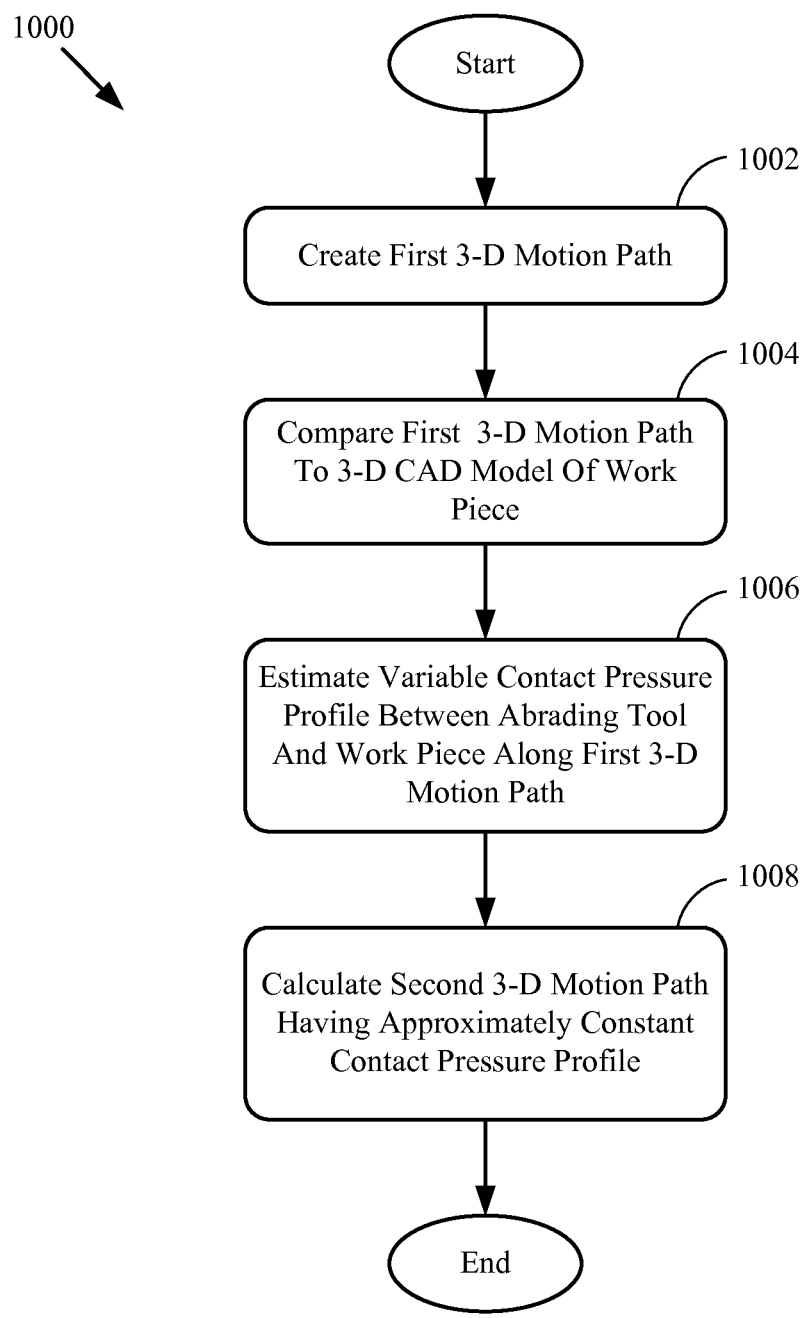
FIG. 10 illustrates a representative method for refining a three-dimensional motion path for a robotic surface finishing tool.

FIG. 10 illustrates a method 1000 for determining a three-dimensional motion path for a surface finishing tool. In step 1002, a first three-dimensional motion path is created. The path is created as described for FIG. 8 using a three-dimensional CAD model or as described for FIG. 9 using a multi-axis sensing apparatus or by another method altogether. In step 1004, the first three-dimensional motion path is compared to a three-dimensional CAD model of a work piece to determine one or more variable profiles along the three-dimensional motion path. Variable profiles include position, angular orientation, contact force, contact area, contact pressure or other variables that influence surface finishing tool abrasion results. In step 1006 a variable contact pressure profile between an abrading tool and the work piece along the first three-dimensional motion path is estimated. In step 1008 a second three-dimensional motion path is calculated having an approximately constant contact pressure profile along the second three-dimensional motion path. The position and/or angular orientation of the surface finishing tool are adjusted based on the calculated second three-dimensional motion path to provide an approximately constant contact pressure when abrading the surface of the work piece.

Figure 11:
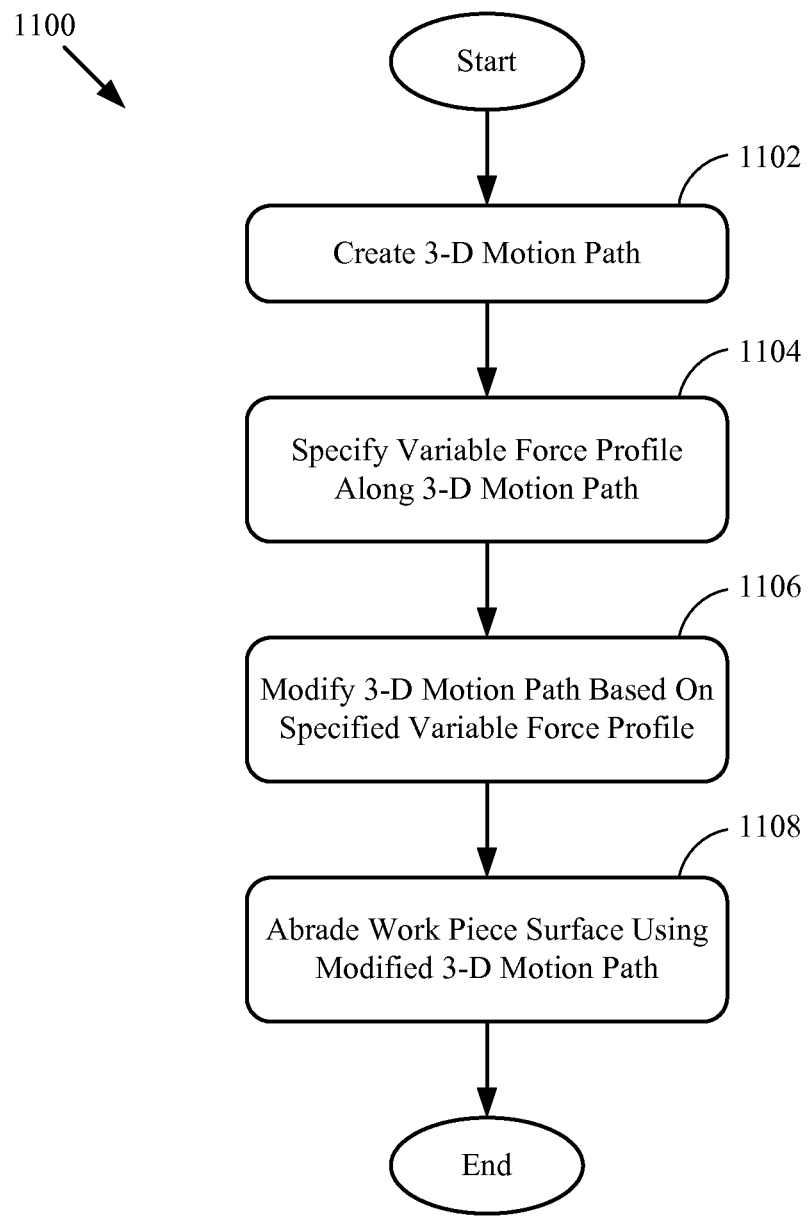
FIG. 11 illustrates a representative method for smart automated robotic surface finishing.

FIG. 11 illustrates a method 1100 for abrading a surface of a work piece. In step 1102, a three-dimensional motion path is created. In step 1104 a variable force profile is specified along the three-dimensional motion path. In one embodiment, the variable force profile provides an approximately constant pressure profile between a surface finishing tool and the surface of the work piece. A variable force profile is specified using a computer simulation of contact between the surface finishing tool and the work piece along the three-dimensional motion path. In step 1106, the three-dimensional motion path is modified based on the specified variable force profile. In step 1108 the surface of the work piece is abraded using the modified three-dimensional motion path. In one embodiment, the three-dimensional motion path is further modified in real time while abrading the surface using a force feedback system. In one embodiment, the force feedback system uses a multiple axis load cell to sense forces and moments along and about one or more axes of the surface finishing tool relative to the surface of the work piece. In one embodiment, the modified three-dimensional motion path modified in step 1106 is determined to minimize the expected variation to be measured by the force feedback system.

Figure 12:
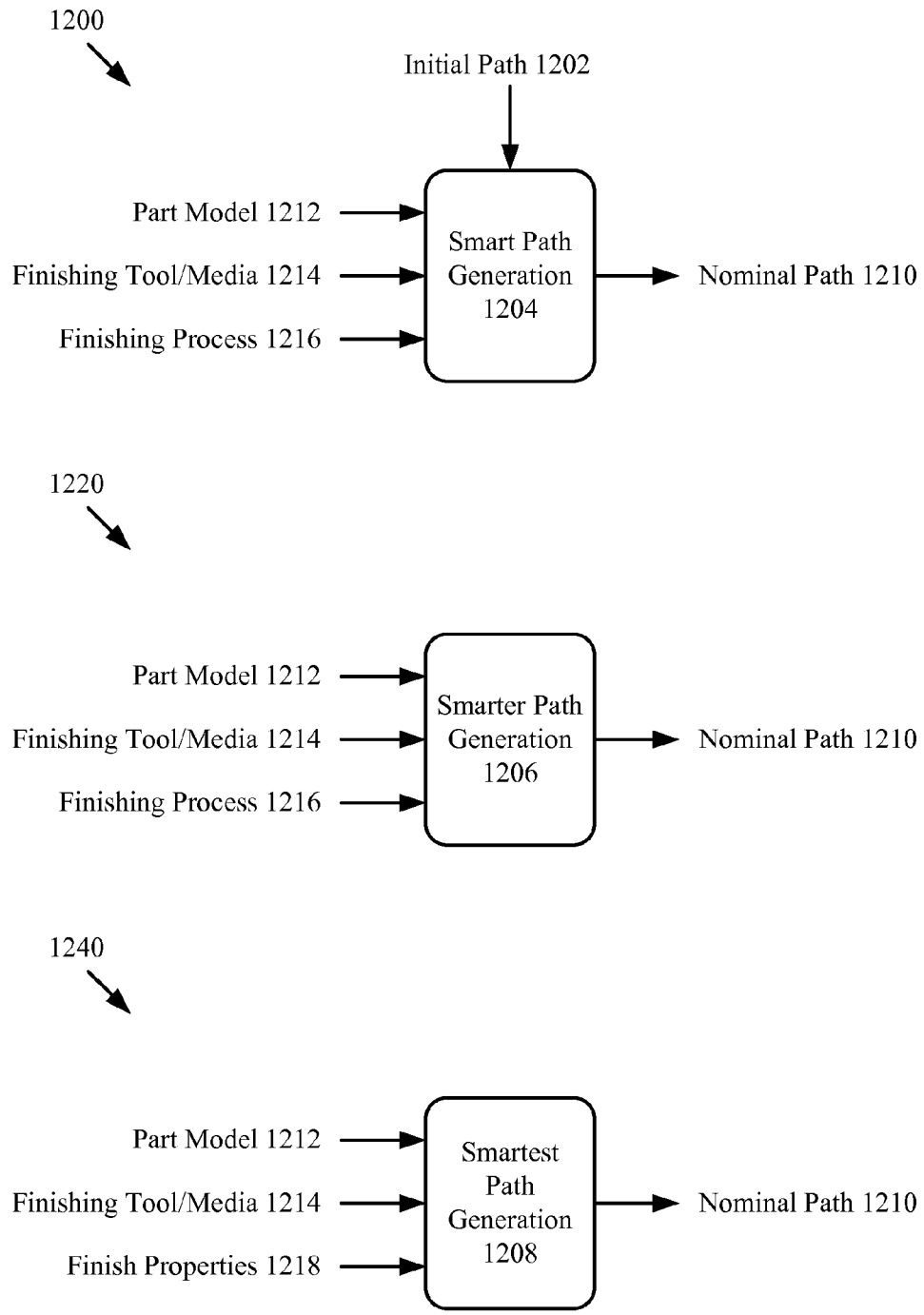
FIG. 12 illustrates several representative information input combinations for three-dimensional motion path generation.

FIG. 12 summarizes several different combinations of information that can be used by a motion path generation method, apparatus or computer readable medium to create a nominal three-dimensional motion path 1210. In a first combination 1200, a smart path generation 1204 processing block can create a nominal three-dimensional motion path 1210 based on an initial three-dimensional motion path 1202 and several key inputs. The key inputs for generating the nominal three-dimensional motion path 1210 can include a three-dimensional part model 1212, such as a three-dimensional CAD model that represents a target shape for the finished part as described earlier. An additional input can include information about surface finishing tools and finishing media 1214 that can be used to produce a desired surface finish to a work piece (part). The surface finishing tools can include robotic controlled equipment that can cut, grind, sand, polish or perform another surface finishing operation. Characteristics of the motion that can be undertaken by the surface finishing tool including macro movement (such as of a robotic arm) and micro movement (such as rotation, translation, vibration of a finishing media plate/head mounted on the end of the robotic arm) can be included in the surface finishing tool information input 1214. Information about the surface finishing media 1214 used by the surface finishing tool can also be included, such as abrasion level (coarse, fine, very fine) and shape conformability of the surface finishing media that contacts the surface of the part to be finished during the surface finishing process. Additional key inputs can include information about the surface finishing process 1216. The surface finishing process input variables can include characteristics such as dwell time, contact time, surface speed and pressure/force applied that can affect the surface finish based on one or more surface finishing media used. In addition the surface finishing process input variables can include one or more preferred path shape properties, such as "side to side", serpentine, sinusoidal, spiral or other shapes. Different referred path shapes can be specified for different regions on the surface of the part to be finished. The smart path generation 1204 processing block can use the key inputs to modify the initial three-dimensional motion path 1202 to produce a nominal three-dimensional motion path 1210 for one or more combinations of surface finishing tools and surface finishing media.

In a second combination 1220, a "smarter" path generation 1206 processing block can create the nominal three-dimensional motion path 1210 using the same set of key inputs described above for the "smart" path generation 1204 processing block but excluding the initial three-dimensional motion path 1202 input. The "smarter" path generation 1206 processing block can synthesize the nominal three-dimensional path 1210 by connecting together path segments having shaped properties that can be defined by the surface finishing process 1216 input. The "smarter" path generation 1206 processing block can seek to optimize properties of the resulting nominal path 1210 including time to execute and the number of changes in surface finishing tools/media 1214 required to execute the determined nominal path 1210.

In a third combination 1240, a "smartest" path generation 1208 processing block can create the nominal three-dimensional motion path 1210 using the key inputs of the three-dimensional part model 1212 and information about the surface finishing tools and surface finishing media 1214 along with a set of desired surface finish properties 1218. The surface finish properties 1218 can replace the surface finishing process 1216 variables and can include a smoothness (geometrical characteristic) and luster (optical characteristic) of a surface finish. A level of uniformity can be specified as well in the surface finish properties 1218. The "smartest" path generation 1208 processing block can then determine the nominal path 1210 using the set of surface finishing tools and surface finishing media 1214 specified that will have the specified surface finish properties 1218 (within a specified tolerance).

Figure 13:
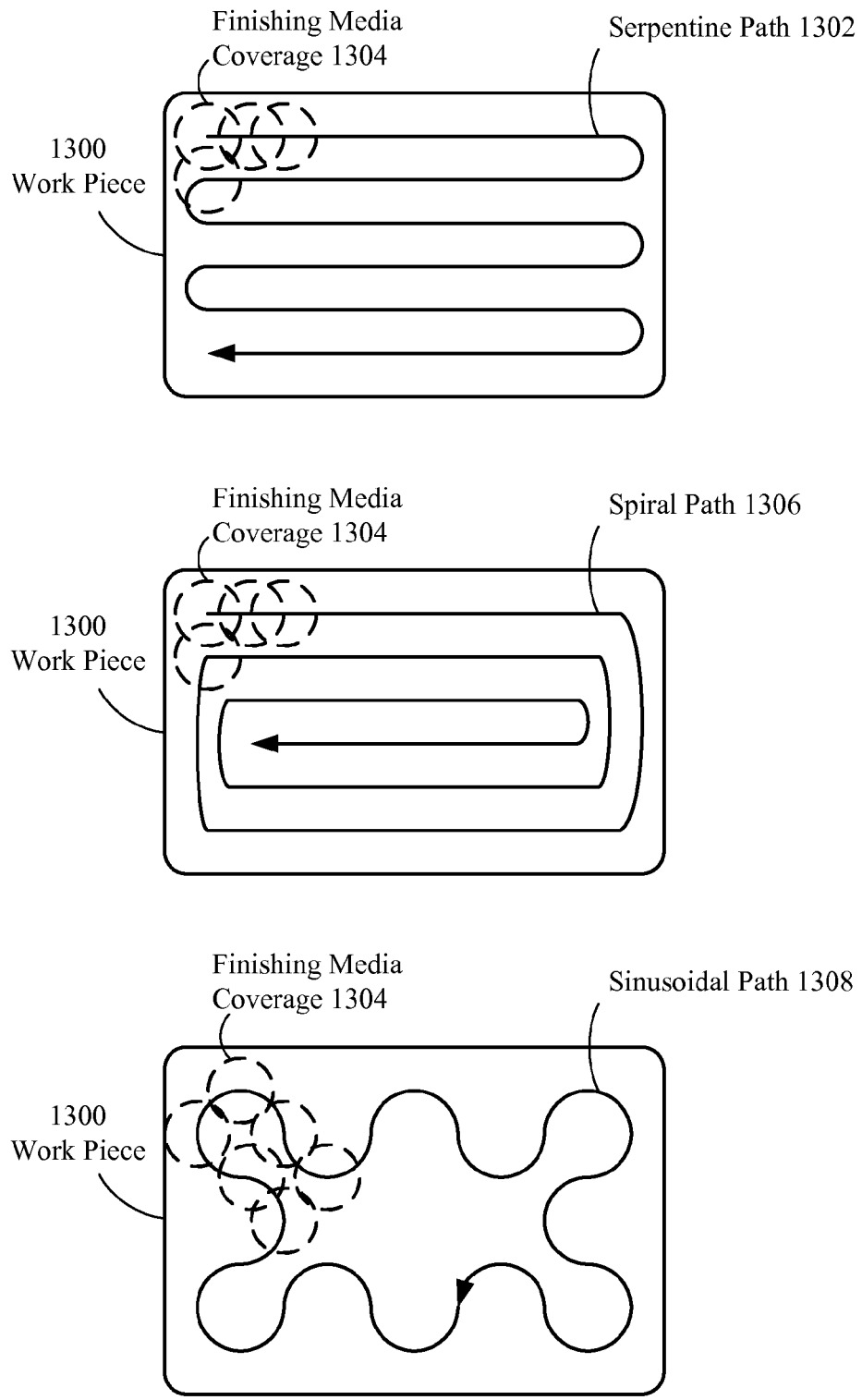
FIG. 13 illustrates several representative three-dimensional motion paths having particular path shape properties.

FIG. 13 illustrates a set of representative motion paths having particular path shape properties. A surface of a work piece 1300 can be finished by a surface finishing media on a surface finishing tool attached to a robotic arm that can traverse and orient the surface finishing tool along the surface of the work piece 1300 following the motion path. Representative shapes for the motion paths include a serpentine path 1302 that traverses the surface side to side from one edge to another edge, a spiral path 1306 that traverses the surface in concentric segments inward from the outer edges to the center (equivalently can traverse outward from center to outer edges), and a sinusoidal path 1308 that oscillates along a trajectory around the edge of the surface of the work piece 1300 as shown. A nominal three-dimensional motion path 1210 can be generated using one of the path generation processing blocks 1206/1208/1210 that includes one or more segments with shapes resembling those shown in FIG. 13. Other shapes can also be used, such as concentric circles/ellipses, step functions, triangle functions, etc. No loss of generality is intended by the illustration of the representative paths 1302/1306/1306 shown. The surface finishing media coverage 1304 of the surface finishing media on the surface of the work piece 1300 can be used with the path shape to determine the nominal path 1210 path trajectory. The surface finishing media coverage 1304 can vary across different regions of the work piece 1300 based on contact of the surface finishing media to the surface of the work piece 1300. The path generation processing blocks 1206/1208/1210 can account for changing shape properties (conformability, compressibility, etc.) of the surface finishing media 1304 along flat, edge, corner, convex, concave and other shaped regions of the work piece 1300. The nominal three-dimensional motion path 1210 generated can ensure complete coverage of the surface of the work piece 1300 and a uniform surface finish.

Figure 14:
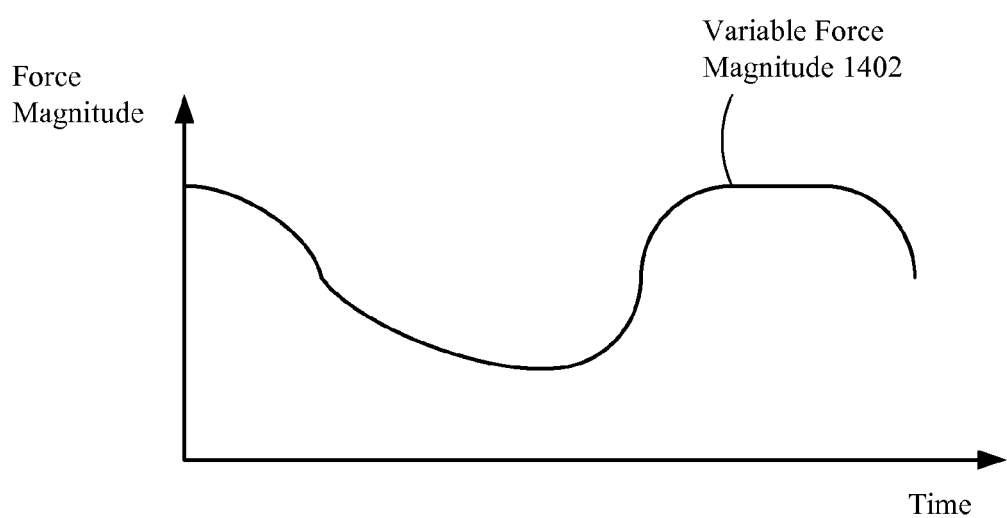
FIG. 14 illustrates a variable force magnitude plot.

To achieve a uniform surface finish on a three-dimensional surface that can vary in curvature (flat to highly curved) in different regions, the nominal three-dimensional motion path 1210 can define a sequence of positions (x, y, z) and angular orientations (rX, rY, rZ) at discrete time values for one or more surface finishing tools/media 1214. The position and angular orientation can create a force vector of the surface finishing tool/media 1214 against the surface of the part being finished. The force magnitude can vary along the three-dimensional motion path 1210. FIG. 14 illustrates a variable force magnitude 1402 for a motion path 1210 shown as a curve over time. While the plot in FIG. 14 shows a "continuous" curve, the actual variable force magnitude 1402 can be a sequence of discrete force values at discrete time values. Spacing of the discrete time values can affect the velocity of movement of the surface finishing tool 1214 between points as well as affect dwell time of the surface finishing tool/media 1214 at a given point. The angular orientation (rX, rY, rZ) can be specified based on an absolute reference coordinate system or based on a coordinate system relative to the surface of the part to be finished. In a representative embodiment, a force applied by the surface finishing tool can be specified to be normal to the surface of the part at the point of application or to deviate from the normal to the surface by a specified amount ($\Delta rX$, $\Delta rY$, $\Delta rZ$). While the nominal path 1210 can provide a starting point for finishing the surface of a work piece 1300, during the actual surface finishing process, the actual force can be measured and adapted to ensure a variable pressure profile required to achieve a particular surface finish.

Figure 15:
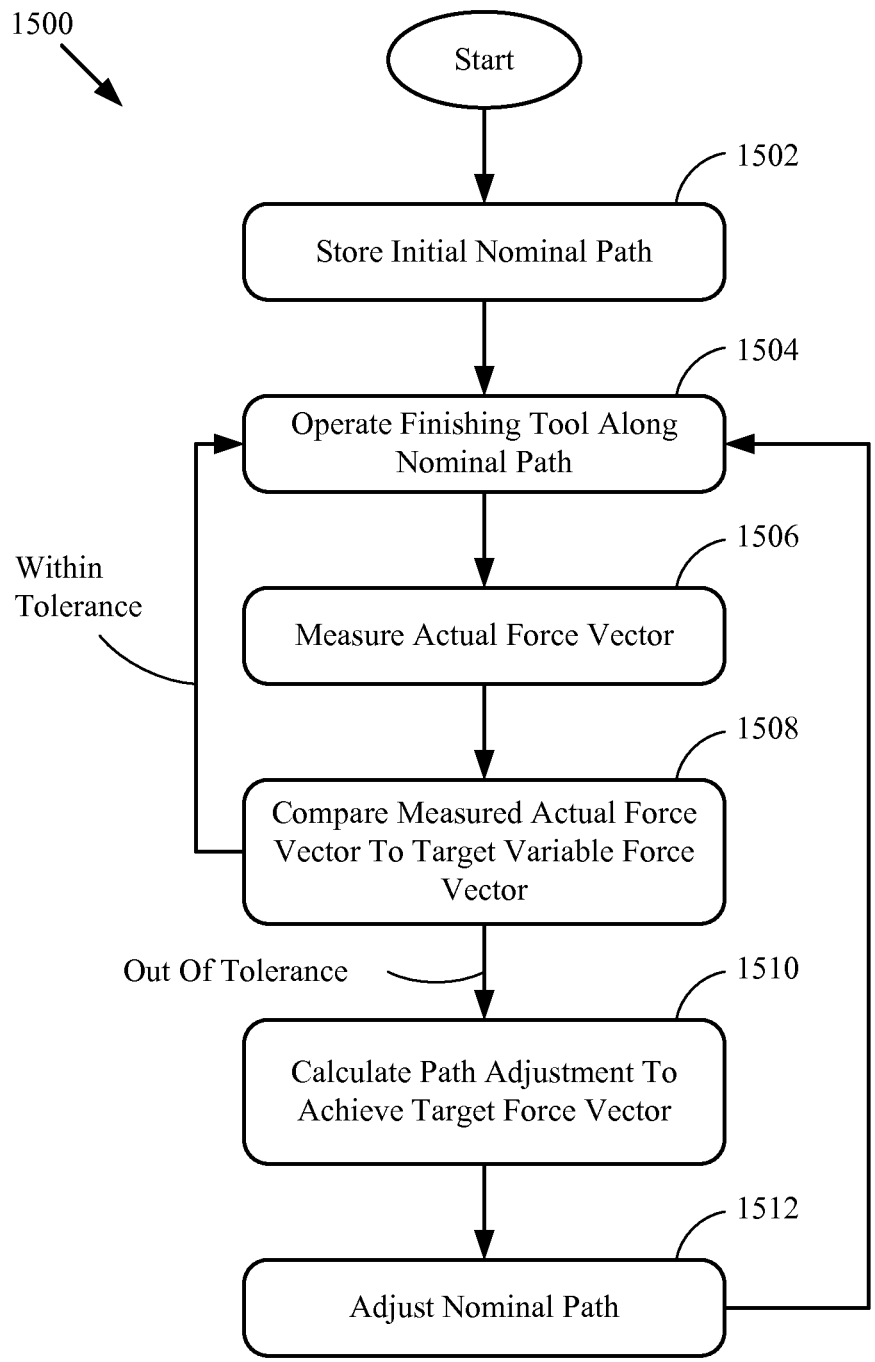
FIG. 15 illustrates a representative method for adapting a three-dimensional motion path.

FIG. 15 outlines a method 1500 for adapting a three-dimensional motion path 1210 for surface finishing a three-dimensional surface of a part. In step 1502, an initial nominal three-dimensional motion path 1210 can be stored. The three-dimensional motion path can be created using path generation as described in FIG. 12. The three-dimensional motion path 1210 can include a sequence of position and angular orientations for a surface finishing tool that uses a surface finishing media applied to the surface of the part. In step 1504, the surface finishing tool can be operated to move along the surface of the part following the nominal three-dimensional motion path 1210. In step 1506, an actual force vector can be measured. In an embodiment, the force vector can be measured using a multiple axis load cell. In step 1508, the measured actual force vector can be compared to a target variable force vector for the position measured along the nominal path 1210. The comparison in step 1508 can determine whether the measured actual force vector differs from the target variable force vector within a pre-determined tolerance value. When the measured actual force vector is within tolerance of the target variable force vector, the method 1500 can continue by returning to step 1504 and continuing to operating the surface finishing tool along the current nominal path 1210. When the measured actual force vector differs from the target variable force vector by more than the pre-determined tolerance value, in step 1510, a path adjustment can be calculated to achieve the target force vector. In step 1512, the calculated adjustment can be applied to adjust the nominal path 1210. The method 1500 can then continue in step 1504 to operate the surface finishing tool along the current (and now adjusted) nominal path 1210. The cycle of moving along the nominal path 1210 with measurements and feedback for adjustment can repeat until the surface finishing tool has completed executing the entire nominal three-dimensional motion path 1210.

Figure 16:
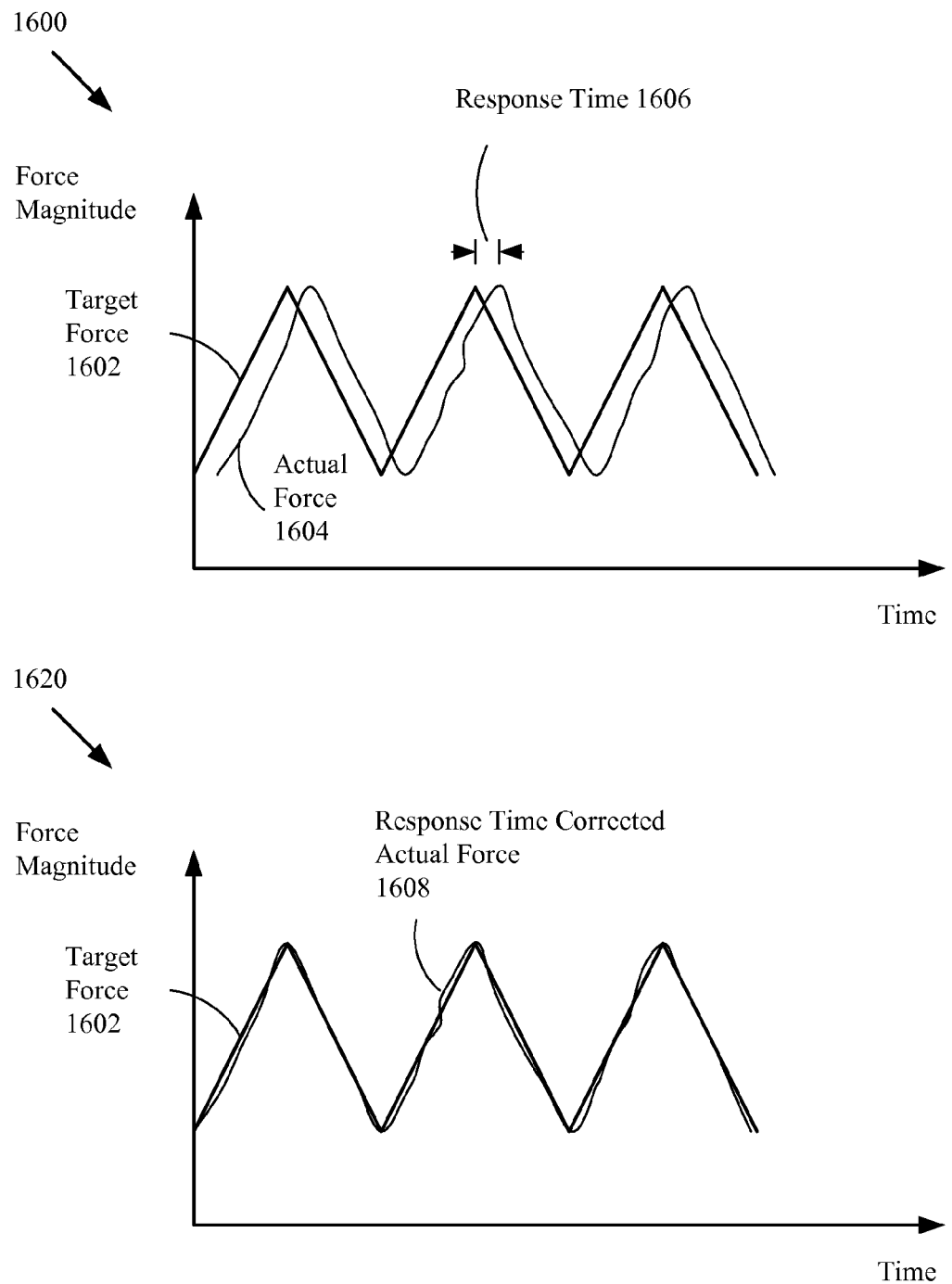
FIG. 16 illustrates response time correction for target force vectors.

The measuring (1506), comparing (1508), calculating (1510) and adjusting (1512) steps can take a finite amount of time to complete, and as shown in the force magnitude graph 1600 in FIG. 16, an actual force vector 1604 (magnitude only shown) can lag a target force vector 1602 by a finite response time 1606. The finite response time 1606 can be a relatively fixed amount based on sampling rate, processing capability and control responsiveness of the surface finishing system. In some embodiments, the finite response time 1606 can be pre-determined and compensated for resulting in a response time corrected actual force 1608 as shown in the force magnitude graph 1620 that aligns more closely with the target force 1602 profile.

Figure 17:
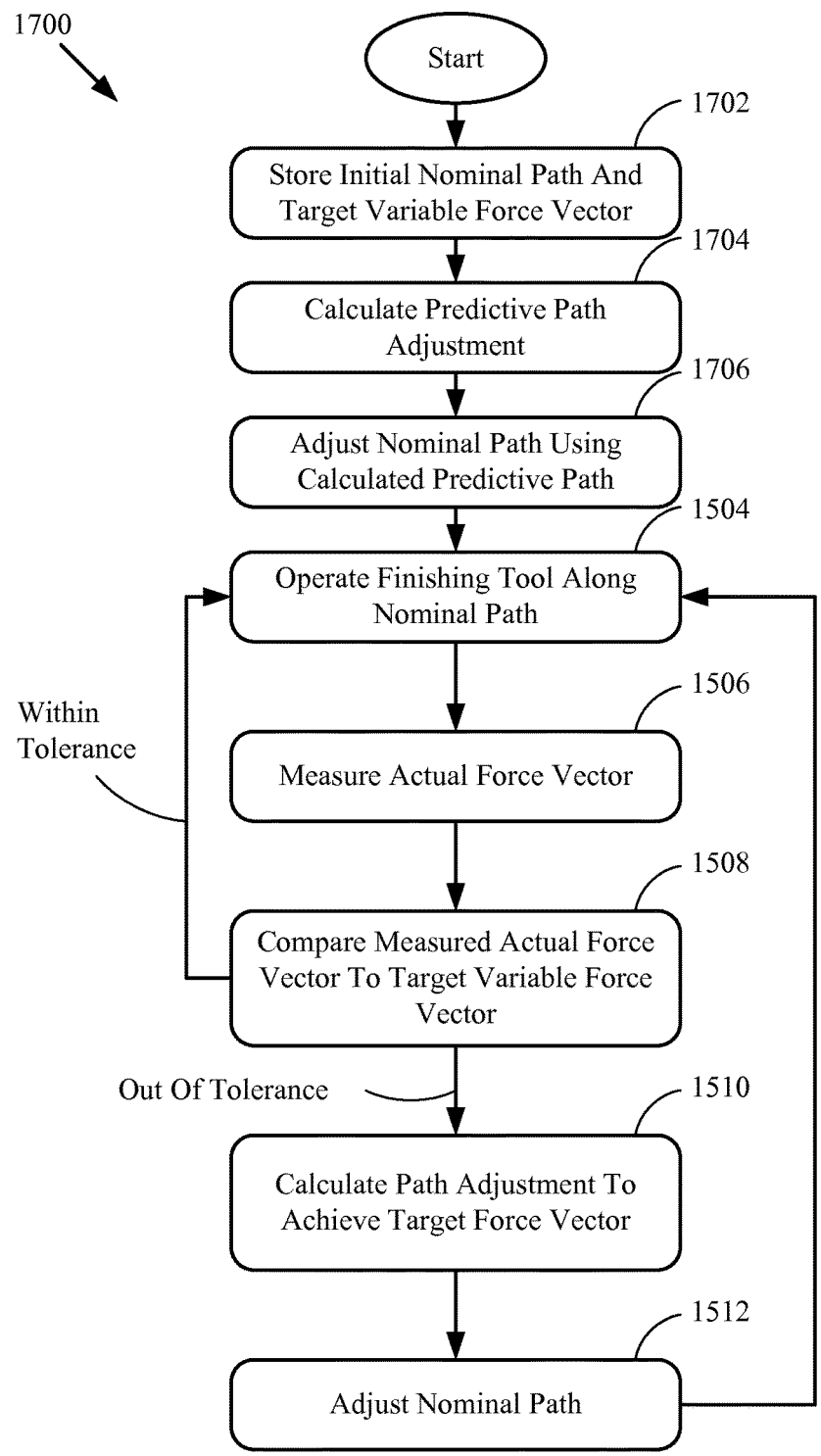
FIG. 17 illustrates another representative method to adapt a three-dimensional motion path.

FIG. 17 illustrates a method 1700 to adapt the three-dimensional motion path 1210 in an "intelligent" manner that includes compensation for the finite response time 1606. In step 1702, both the initial nominal three-dimensional motion path 1210 and a target variable force vector along the nominal three-dimensional motion path 1210. In an embodiment, the target variable force vector can account for target contact area differences that can occur between the surface finishing tools/media and the surface of the part being finished and be set to achieve an approximately uniform pressure (force per unit area). In step 1704, a predictive path adjustment can be calculated to account for response time, and in step 1706 the nominal path 1210 can be adjusted using the calculated predictive path. The remainder of the method 1700 can then use the same set of steps as shown in FIG. 15 to operate a surface finishing tool with force feedback measurements and adjustments.

As briefly explained above a nominal path can be generated by computer simulation and/or experimentation. The nominal path generally includes a finishing path for a finishing tool arranged across a surface of a workpiece, a velocity profile for the finishing tool dictating velocity along the finishing path, and a force profile for the finishing tool dictating an amount of force to exert along different portions of the finishing path. Determining a nominal path for the finishing tool by experimentation only can be a drawn out, time consuming process. When processing a three dimensional surfaces using tools that can be almost infinitely adjustable, a trial and error method can be extremely inefficient. One type of simulation that can be applied in a situation such as this is finite element analysis. Finite element analysis can be used to determine the nominal path by simulating actual interaction between a finishing tool and the workpiece to determine actual finishing tool requirements for every portion of the workpiece for a desired surface finish and geometry.

Figure 18A:
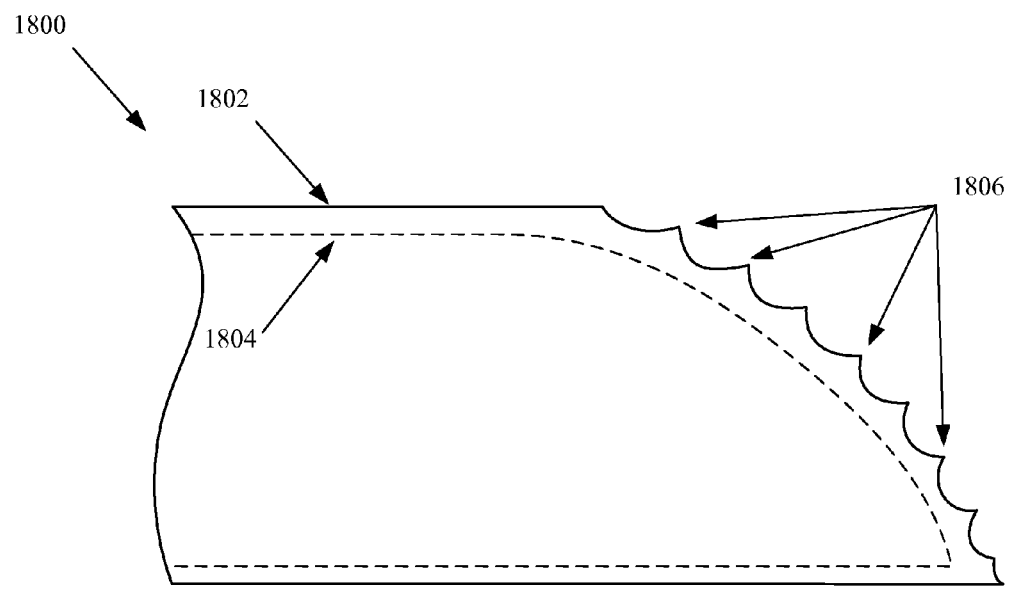
FIGS. 18A-18B illustrate a workpiece undergoing a finishing operation.
Figure 18B:
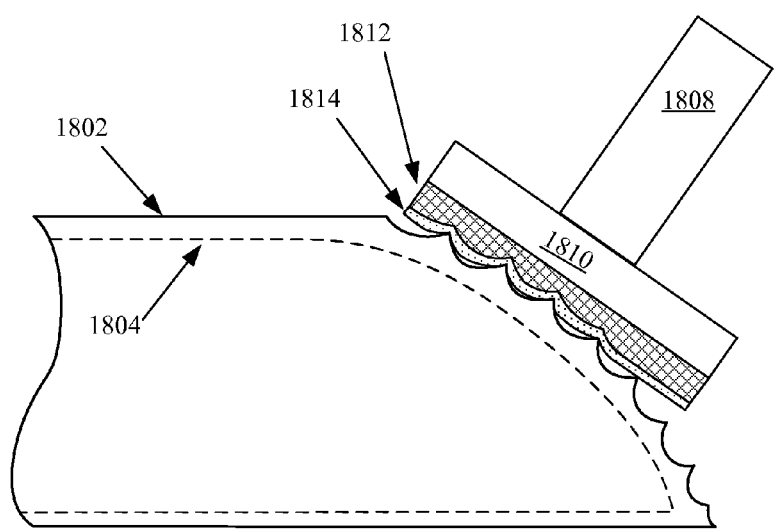

FIG. 18A shows a workpiece 1800. Workpiece 1800 can have an initial geometry 1802 and a desired geometry 1804. Initial geometry 1802 can include any number of machining artifacts 1806 causing substantial surface variation in workpiece 1800. Machining artifacts 1806 as depicted can be a result of a preceding ball milling process. As a result of machining artifacts 1806 an appropriate machining path can be quite difficult to predict since a finishing tool can exert a large range of pressure across machining artifacts 1806. FIG. 18B shows a finishing tool embodied as sander 1808. Sander 1808 can include a rigid spinning disk 1810 mechanically coupled to foam pad 1812 which is then mechanically coupled to sanding disk 1814. In this embodiment foam pad 1812 can allow sanding disk 1814 come into contact with more than just end portions of machining artifacts 1806; however, as a result force is substantially higher on tip portions of machining artifacts 1806 as a result of concentrated pressure applied along more compressed portions of foam pad 1812. Furthermore, as illustrated portions of the workpiece under the sander may not even come into contact with sanding disk 1814, making material removal profiling particularly difficult and highly dependent upon material properties of the robot, and sander 1808 which includes rigid spinning disk 1810, foam pad 1812 and sanding disk 1814.

Figure 19:
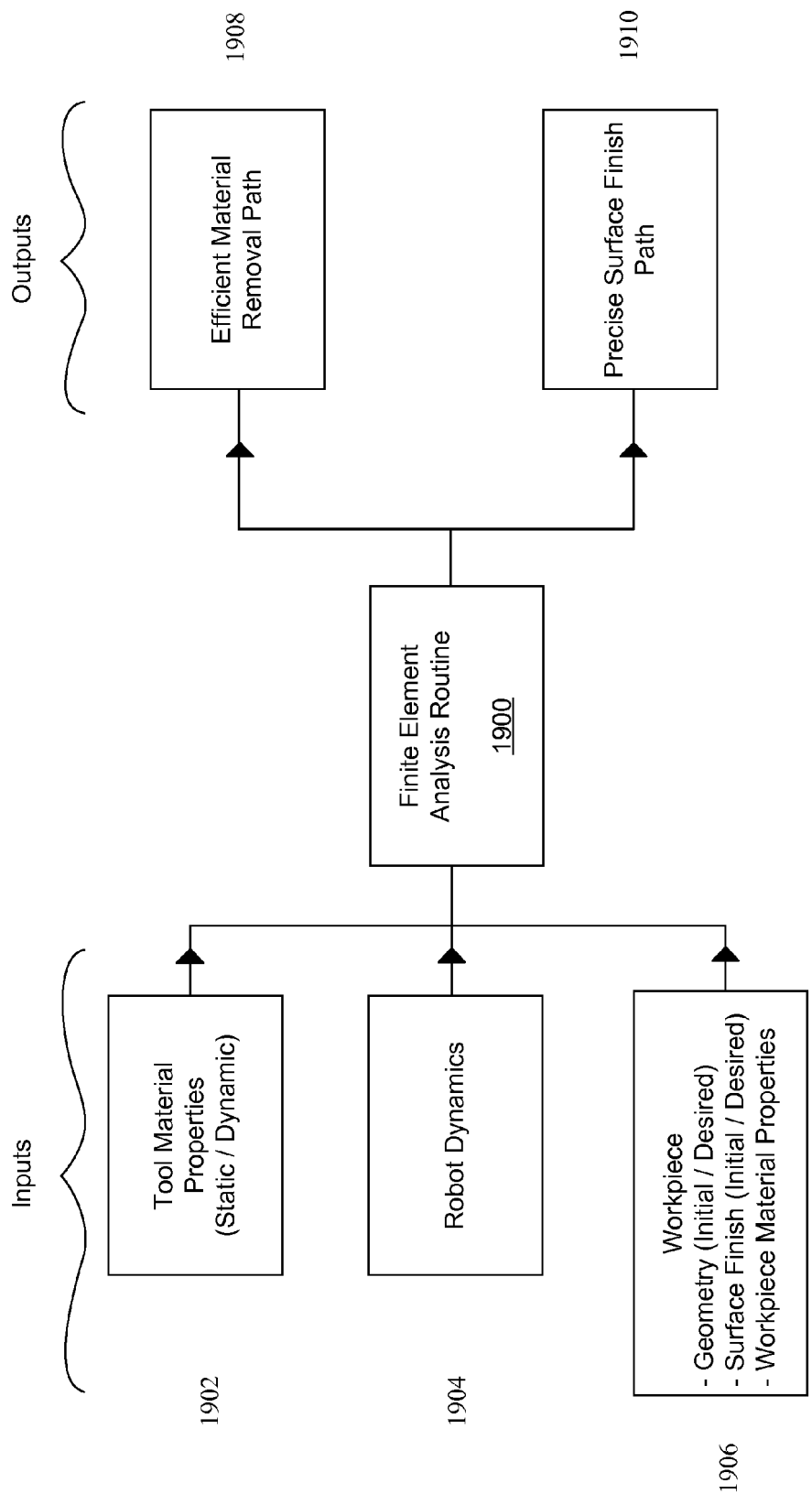
FIG. 19 illustrates a block diagram representing inputs and outputs of a finite element analysis routine.

FIG. 19 shows a finite element analysis process. Finite element analysis routine 1900 receives a number of inputs describing parameters associated with a finishing process. A first input set 1902 includes parameters describing finishing tool material properties including both static and dynamic properties. Static properties of the finishing tool include dimensions of the tool, tool mass, stiffness and viscoelastic properties. Dynamic properties include possible motions of the tool itself such as for example sanding disk rotational speed. It should be noted that in some embodiments multiple finishing tools can be used either consecutively or simultaneously during the finishing operation. Second input set 1904 includes potential robot dynamics which include range of motion information such as potential paths, angle at which the tool can be held relative to the workpiece, amount of force that can be applied through the tool and translational speeds for the tool. Third input set 1906 includes parameters associated with the workpiece itself. This includes material composition of the workpiece as well as any preceding machining operations that can cause changes to material properties of the workpiece. Initial geometry of the workpiece is also quite important. For example, machining artifacts 1806 of workpiece 1800 can as previously described cause substantial variation in finishing operations applied to the workpiece. Finite element analysis will be most effective when surface variations such as machining artifacts 1806 are generally consistent between workpiece samples. In some cases loose manufacturing tolerances can cause sample variations between robots, finishing tools, or workpieces, thereby adversely affecting the generated nominal path. Wide variations can be accommodated by analyzing parameters from two extremes of a possible variation, thereby helping to find a nominal path solution that fits both variations. Third input set 1906 also includes a final desired geometry of the workpiece which will largely drive finishing operations. An initial and desired surface finish or consistency of the workpiece is also an important input into finite element analysis routine 1900.

Finite element analysis routine 1900 can use input sets 1902, 1904, and 1906 to conduct a substantially accurate simulation of possible paths for the finishing tool across a three dimensional surface portion of the workpiece. Since the finite element analysis routine 1900 can accurately determine an amount of finishing force required at each portion of the workpiece it can also provide a close approximation for effective paths a finishing tool can take across the workpiece to achieve a desired surface finish and geometry. By iterating through a number of machining paths and profiles a best fit path can be determined. As described finite element analysis information can be used to determine a preferred path for efficient material removal 1908 and/or a preferred path for precise surface finish 1910. In many cases a careful balance can be made between the two determined paths. For example, in a first portion of a finishing operation material removal can be preferred; however, in some cases aggressive material removal can adversely affect subsequent surface finish operations across some portions of the workpiece. For example, overheating of the workpiece can be caused by rapid material removal along a surface of the workpiece. Inputs from precise surface finish path 1910 can be used to temper such adverse effects. As material removal comes close to causing the workpiece to match a desired geometry precise surface finish path 1910 can become more heavily weighted than material removal path 1908 so that a desired surface finish can be obtained. It should be noted that in most embodiments finite element analysis routine 1900 will be used to calibrate the nominal path for a given model of tool, robot, and workpiece. In some cases experimental adjustments can be used to fine tune a nominal path for a finishing operation. Furthermore the embodiments previously described in relation to force feedback can be used in conjunction with this weighted nominal path determination to provide more accurate finishing operations. In some embodiments characteristics of a force feedback sensor associated with the robot or the finishing tool can be incorporated into the finite element analysis model.

Figure 20:
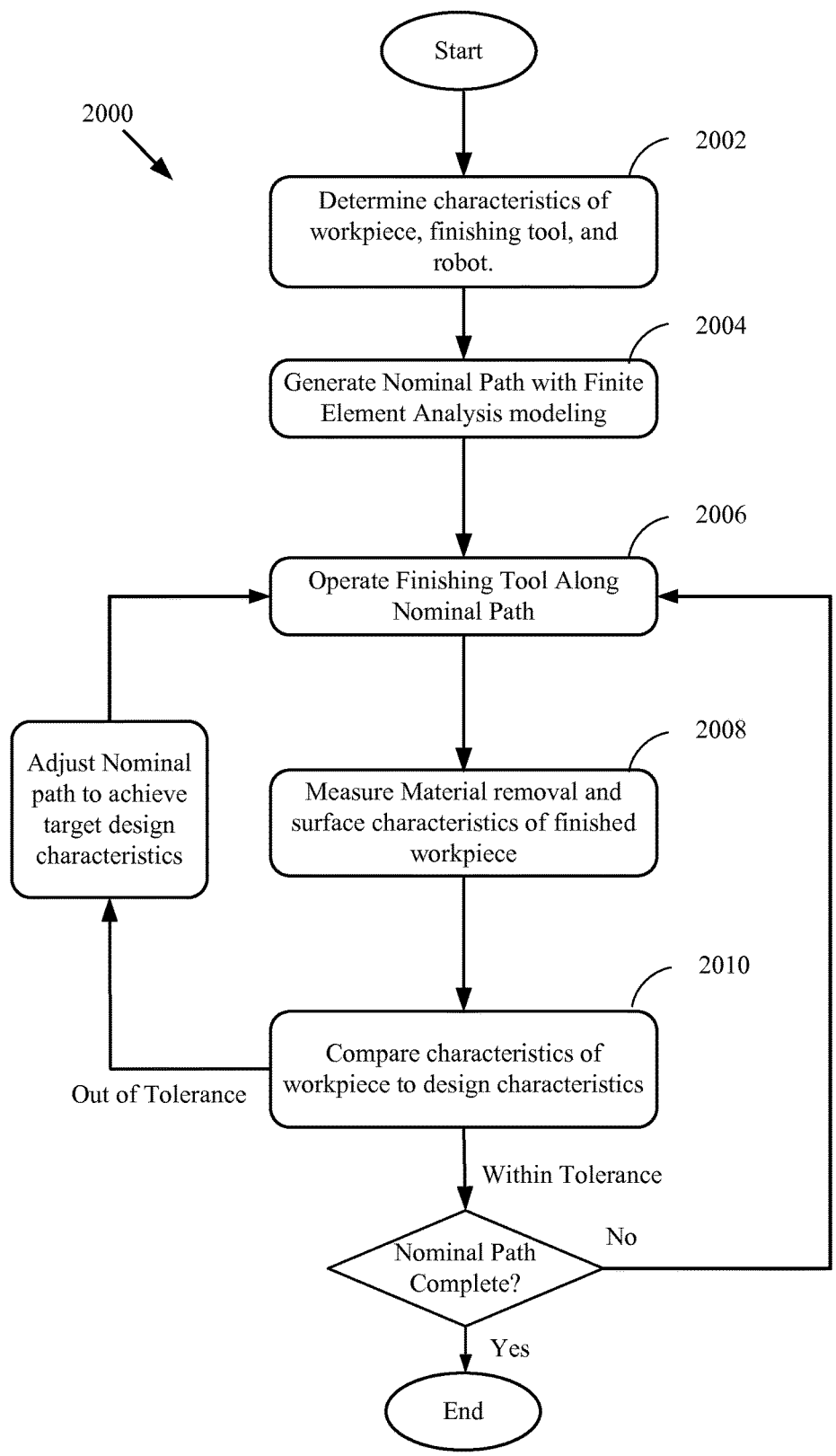
FIG. 20 illustrates a block diagram of a process for creating and refining a nominal path.

FIG. 20 shows a black diagram for a process 2000 in which a nominal path is created and refined for machining a workpiece. In a first step 2002 characteristics associated with a workpiece, finishing tool, and robot are gathered. Characteristics of the workpiece include material composition, geometry of the workpiece before the finishing process, desired geometry of the workpiece after the finishing process, and desired surface finish of the workpiece after the finishing process. Characteristics of the robot include path, angle and force associated with robotic movement of the finishing tool. Characteristics of the finishing tool include physical dimensions, mass, stiffness and viscoelastic properties of the finishing tool, and additionally motion of the finishing tool itself. In step 2004 a finite element analysis conducted using the determined characteristics can make a determination of a nominal path along with a finishing tool can traverse to properly achieve a specific geometry and surface finish of the workpiece. In step 2006 the finishing tool is maneuvered by the robot along the nominal path. Upon finishing the nominal path, or at measured intervals a measuring of the material removal and surface finish can be accomplished in step 2008. This measurement can in some embodiment be accomplished by a three dimensional scan of the workpiece. In step 2010 the scanned characteristics can then be compared against a three dimensional model having a designed geometry and surface finish for the workpiece, or in some embodiments a desired geometry of the workpiece at a given point in the finishing operation. If the characteristics are outside of machining tolerances for the given workpiece the nominal path is adjusted to compensate for the errors, otherwise in some embodiments the process ends while in other embodiments the finishing tool continues along the nominal path until complete or until another material removal surface consistency check is desired. In this way a finite element model simulation can be refined by experimentally measuring performance of the nominal path.

The methods outlined above can be implemented using a combination of computer aided design tools, computer hardware, robotic machinery control hardware/software and computer controlled robotic finishing tools. In an embodiment, input variables and measured variables used for the design and/or analysis of three-dimensional motion paths can be displayed. One or more variables in a set of input variables and measured variables can be displayed to a user. The set of input variables and measured variables can include at least a target force vector, an actual force vector, a normal direction displacement, a target velocity and an actual velocity. In addition, three-dimensional models of a robotic surface finishing tool and a work piece (such as a casing or other work piece to which robotic surface finishing can be applied) can be displayed to the user. Displayed information can include intersecting surfaces between the robotic surface finishing tool and the work piece. The intersecting surfaces can be used to estimate, analyze and refine a contact surface area between an abrading surface of the robotic surface finishing tool and the surface of the work piece.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for machining and polishing a workpiece to form a target workpiece, the method comprising, at a controller unit in communication with a single material removal tool:

generating (i) a simulated material removal path for modifying dimensions of the workpiece according to desired dimensions of the target workpiece, and (ii) a simulated surface finishing path for polishing the workpiece according to a desired surface finish of the target workpiece;

generating an intermediate three-dimensional path along the workpiece that is based on a difference between at least one characteristic of the workpiece and at least one corresponding desired characteristic of the target workpiece, wherein the intermediate three-dimensional path includes a first weighted amount of the simulated material removal path and a second weighted amount of the simulated surface finishing path;

receiving, from the controller unit, a signal associated with the intermediate three-dimensional path at the single material removal tool; and causing, in response to receiving the signal, the single material removal tool to remove an amount of material from the workpiece in accordance with the intermediate three-dimensional path.

2. The method of claim 1, wherein, subsequent to the removal of the amount of material from the workpiece, the method further comprises:
comparing the at least one characteristic to the at least one corresponding desired characteristic of the target workpiece; and
when there is a discrepancy between the at least one corresponding desired characteristic and the at least one characteristic:
adjusting each of the first and second weighted amounts to reduce the discrepancy.

3. The method of claim 1, wherein the method further comprises:
determining an amount of finishing force to be applied to the workpiece in conjunction with removing the amount of material.

4. The method of claim 1, wherein the method further comprises:
receiving an amount of force feedback while removing the amount of material from the workpiece; and
adjusting each of the first and second weighted amounts based on the amount of force feedback.

5. The method of claim 2, further comprising:
generating a subsequent intermediate three-dimensional path along the workpiece that is based on the first and second adjusted weighted amounts.

6. The method of claim 1, wherein the single material removal tool is coupled to a robotic handler having 6-degrees of freedom of movement.

7. The method of claim 1, wherein the at least one characteristic includes a material composition.

8. The method of claim 1, wherein the intermediate three-dimensional path is further based on one or more properties of the single material removal tool.

9. A material processing system for machining and polishing a workpiece to form a target workpiece, the material processing system comprising:
a controller unit capable of:
generating (i) a simulated material removal path for modifying dimensions of the workpiece according to desired dimensions of the target workpiece, and (ii) a simulated surface finishing path for polishing the workpiece according to a desired surface finish of the target workpiece, and
generating an intermediate three-dimensional path along the workpiece that is based a difference between at least one characteristic of the workpiece and at least one corresponding desired characteristic of the target workpiece, wherein the intermediate three-dimensional path includes a first weighted amount of the simulated material removal path and a second weighted amount of the simulated surface finishing path; and
a material removal tool in communication with the controller unit and capable of removing an amount of material from the workpiece in accordance with the intermediate three-dimensional path.

10. The material processing system of claim 9, wherein the material processing system further comprises:
an analysis module in communication with the controller unit, the analysis module configured to:
obtain the at least one characteristic of the workpiece subsequent to removing the amount of material,
compare the at least one characteristic to the at least one corresponding desired characteristic of the target workpiece, and
when there is a discrepancy between the at least one characteristic and the at least one corresponding desired characteristic:
cause the controller unit to adjust each of the first and second weighted amounts in order to reduce the discrepancy.

11. The material processing system of claim 9, further comprising a force feedback sensor coupled to the material removal tool.

12. The material processing system of claim 10, wherein the at least one characteristic of the workpiece is provided by a three-dimensional scanner that is in communication with the controller unit.

13. The material processing system of claim 10, wherein the at least one corresponding desired characteristic corresponds to a surface finish or a material composition of the target workpiece.

14. The material processing system of claim 10, wherein the at least one corresponding desired characteristic includes:
an amount of force applied by the material removal tool to a surface of the workpiece;
a surface speed of the material removal tool;
an amount of contact time between the material removal tool and the surface of the workpiece; or
an angle of the material removal tool relative to the surface of the workpiece.

15. The material processing system of claim 10, wherein the analysis module is further configured to:
determine a difference between the amount of material removed from the workpiece and a targeted amount of material to be removed from the workpiece;
when the difference between the amount of material removed and the targeted amount of material to be removed exceeds a tolerance value:
cause the controller unit to reduce the difference.

16. A non-transitory computer readable medium storing instructions that, when executed by one or more processors of a material processing system, cause the material processing system to:
generate (i) a simulated material removal path for modifying dimensions of a workpiece according to desired dimensions of a target workpiece, and (ii) a simulated surface finishing path for polishing the workpiece according to a desired surface finish of the target workpiece;
generate a control signal associated with an intermediate three-dimensional path;
provide the control signal to a single material removal tool that causes the single material removal tool to remove an amount of material from the workpiece according to the intermediate three-dimensional path, wherein the amount of material removed corresponds to a first weighted amount of the simulated material removal path and a second weighted amount of the simulated surface finishing path;
obtain a characteristic of the workpiece subsequent to removing the amount of material;
compare the characteristic to a target characteristic of a target workpiece; and
when the characteristic does not correspond to the target characteristic:
adjust the first and second weighted amounts to remove an updated amount of material from the workpiece.

17. The non-transitory computer readable medium of claim 16, wherein the characteristic of the workpiece is provided by a scanner that is in communication with the material processing system.

18. The non-transitory computer readable medium of claim 16, wherein comparing the characteristic to the target characteristic includes:
   determine a difference between the amount of material removed from the workpiece and a targeted amount of material to be removed from the workpiece.

19. The non-transitory computer readable medium of claim 18, wherein removing the updated amount of material reduces the difference.

20. The non-transitory computer readable medium of claim 16, wherein the one or more processors further causes the material processing system to:
   continuously monitor an amount of force feedback between the material removal tool and the workpiece while removing the amount of material; and
   adjust the updated removal amount based on the monitored amount of force feedback.

* * * * *